US012765981B2

(12) United States Patent
Wagner et al.

(10) Patent No.: US 12,765,981 B2
(45) Date of Patent: Oct. 20, 2026

(54) ORAL IRRIGATOR ASSEMBLY

(71) Applicant: WATER PIK, INC., Fort Collins, CO (US)

(72) Inventors: Robert Wagner, Firestone, CO (US); Christina McClard, Fort Collins, CO (US)

(73) Assignee: WATER PIK, INC., Fort Collins, CO (US)

(*) Notice: Subject to any disclaimer, the term of this patent is extended or adjusted under 35 U.S.C. 154(b) by 674 days.

(21) Appl. No.: 17/841,911

(22) Filed: Jun. 16, 2022

(65) Prior Publication Data

US 2022/0304784 A1 Sep. 29, 2022

Related U.S. Application Data

(62) Division of application No. 15/843,911, filed on Dec. 15, 2017, now Pat. No. 11,389,279.

(60) Provisional application No. 62/434,993, filed on Dec. 15, 2016.

(51) Int. Cl.
*A61C 17/02* (2006.01)

(52) U.S. Cl.
CPC .......... *A61C 17/0202* (2013.01); *A61C 17/02* (2013.01)

(58) Field of Classification Search
CPC ..... A61C 17/0202; A61C 17/02; A61C 17/22; A61C 17/225; A61C 17/0205; A61C 17/024; A46B 9/04; A61H 13/00; A61H 13/005; E03C 1/0408; H01H 3/08; H01H 19/14; H01H 3/12; H01H 13/14; H01H 2221/01; H01H 25/06; H01H 25/065
USPC .............................................. 601/162; 200/7
See application file for complete search history.

(56) References Cited

U.S. PATENT DOCUMENTS

| | | | |
|---|---|---|---|
| 555,588 | A | 3/1896 | Spencer |
| 1,278,225 | A | 9/1918 | Schamberg |
| 1,452,258 | A | 4/1923 | Smith |
| 1,464,419 | A | 8/1923 | Gill |

(Continued)

FOREIGN PATENT DOCUMENTS

| | | |
|---|---|---|
| CA | 851479 | 9/1970 |
| CH | 655237 | 4/1986 |

(Continued)

OTHER PUBLICATIONS

US RE27,274 E, 01/1972, Mattingly (withdrawn)

(Continued)

*Primary Examiner* — Victoria Murphy
*Assistant Examiner* — Kris Hanyu Gong

(57) ABSTRACT

The present disclosure includes embodiments directed to an oral irrigator assembly. The oral irrigator assembly may include a base including a pressure assembly, a fluid reservoir removably coupled to the base, an oral irrigator handle fluidly coupled to the fluid reservoir and the pressure assembly, and a control assembly including a push button at least partially surrounded by a knob. The oral irrigator handle may be adjustably coupled to the base via a magnetic attachment. The push button may be arranged to engage a power button to turn the oral irrigator assembly on and off. The knob may be coupled to the pressure assembly to adjust at least one of a pressure and a volume of a fluid expelled through the oral irrigator handle upon movement of the knob.

22 Claims, 23 Drawing Sheets

(56) References Cited

U.S. PATENT DOCUMENTS

| | | | |
|---|---|---|---|
| 1,480,310 A | 1/1924 | Smith | |
| 1,498,267 A | 6/1924 | Hachman | |
| 1,602,742 A | 10/1926 | Bennet | |
| 1,650,686 A | 11/1927 | Binks | |
| 1,669,889 A | 5/1928 | Andrews et al. | |
| 1,681,320 A | 8/1928 | Bergl et al. | |
| 1,933,454 A | 10/1933 | Sidney | |
| 1,940,111 A | 12/1933 | Austin | |
| D93,019 S | 8/1934 | Hose | |
| 1,977,782 A | 10/1934 | Roy | |
| 2,107,686 A | 2/1938 | Bramsen et al. | |
| D159,872 S | 8/1950 | Skold | |
| 2,531,730 A | 11/1950 | Henderson | |
| 2,595,666 A | 5/1952 | Hutson | |
| 2,669,233 A | 2/1954 | Friend | |
| 2,709,227 A | 5/1955 | Foley et al. | |
| 2,733,713 A | 2/1956 | Kabnick | |
| 2,783,919 A | 3/1957 | Ansell | |
| 2,794,437 A | 6/1957 | Tash | |
| 2,870,932 A | 1/1959 | Davis | |
| 2,984,452 A | 5/1961 | Hooper | |
| 3,089,490 A | 5/1963 | Goldberg | |
| 3,096,913 A | 7/1963 | Jousson | |
| 3,144,867 A | 8/1964 | Trupp et al. | |
| D202,041 S | 8/1965 | Burzlaff | |
| 3,209,956 A | 10/1965 | McKenzie | |
| 3,216,619 A | 11/1965 | Richards et al. | |
| 3,225,759 A | 12/1965 | Drapen et al. | |
| 3,227,158 A | 1/1966 | Mattingly | |
| 3,266,623 A | 8/1966 | Poterl | |
| 3,297,558 A | 1/1967 | Hillquist | |
| D208,778 S | 10/1967 | Koch | |
| D209,202 S | 11/1967 | Fulton et al. | |
| D209,203 S | 11/1967 | Mattingly et al. | |
| D209,204 S | 11/1967 | St. Clair et al. | |
| D209,395 S | 11/1967 | Gilbert | |
| D210,018 S | 1/1968 | Mattingly et al. | |
| D210,019 S | 1/1968 | Johnson et al. | |
| 3,370,214 A | 2/1968 | Aymar | |
| 3,391,696 A | 7/1968 | Woodward | |
| 3,393,673 A | 7/1968 | Mattingly et al. | |
| 3,400,999 A | 9/1968 | Goldstein | |
| 3,418,552 A | 12/1968 | Holmes | |
| 3,420,228 A | 1/1969 | Kalbfeld | |
| 3,425,410 A | 2/1969 | Cammack .......... | A61C 17/0205 601/162 |
| 3,453,969 A | 7/1969 | Mattingly | |
| 3,465,751 A | 9/1969 | Powers | |
| 3,467,083 A | 9/1969 | Mattingly | |
| 3,467,286 A | 9/1969 | Ostrowsky | |
| D215,920 S | 11/1969 | McCarty et al. | |
| 3,487,828 A | 1/1970 | Troy | |
| 3,489,268 A | 1/1970 | Meierhoeter | |
| 3,495,587 A | 2/1970 | Freedman | |
| 3,496,933 A | 2/1970 | Lloyd | |
| 3,499,440 A | 3/1970 | Gibbs | |
| 3,500,824 A | 3/1970 | Gilbert | |
| 3,501,203 A | 3/1970 | Falk | |
| 3,502,072 A | 3/1970 | Stillman | |
| 3,517,669 A | 6/1970 | Buono et al. | |
| D218,270 S | 8/1970 | Soper | |
| 3,522,801 A | 8/1970 | Robinson | |
| 3,532,221 A | 10/1970 | Kaluhiokalani et al. | |
| 3,536,065 A | 10/1970 | Moret | |
| 3,537,444 A | 11/1970 | Garn | |
| 3,538,950 A | 11/1970 | Porteners | |
| 3,547,110 A | 12/1970 | Balamuth | |
| 3,561,433 A | 2/1971 | Kovach | |
| D220,334 S | 3/1971 | Mackay et al. | |
| 3,570,525 A | 3/1971 | Borsum | |
| 3,572,375 A | 3/1971 | Rosenberg | |
| 3,578,884 A | 5/1971 | Jacobson | |
| D220,996 S | 6/1971 | Irons | |
| 3,583,609 A | 6/1971 | Oppenheimer | |
| 3,590,813 A | 7/1971 | Roszyk | |
| 3,597,846 A | 8/1971 | Weiss .................... | A61C 17/02 433/77 |
| 3,608,548 A | 9/1971 | Lewis | |
| D222,862 S | 1/1972 | Cook | |
| 3,636,947 A | 1/1972 | Balamuth | |
| 3,651,576 A | 3/1972 | Massa | |
| 3,669,101 A | 6/1972 | Kleiner | |
| 3,703,170 A | 11/1972 | Ryckman, Jr. | |
| 3,718,974 A | 3/1973 | Buchtel et al. | |
| 3,747,595 A | 7/1973 | Grossan | |
| 3,768,472 A | 10/1973 | Hodosh et al. | |
| 3,771,186 A | 11/1973 | Moret et al. | |
| 3,783,364 A | 1/1974 | Gallanis et al. | |
| 3,809,506 A | 5/1974 | Malcosky | |
| 3,809,977 A | 5/1974 | Balamuth et al. | |
| 3,811,432 A | 5/1974 | Moret | |
| 3,820,532 A | 6/1974 | Eberhardt et al. | |
| 3,827,147 A | 8/1974 | Condon | |
| 3,837,166 A | 9/1974 | Hiraoka | |
| 3,840,795 A | 10/1974 | Roszyk et al. | |
| 3,847,145 A | 11/1974 | Grossan | |
| 3,854,209 A | 12/1974 | Franklin et al. | |
| 3,863,628 A | 2/1975 | Vit | |
| 3,871,560 A | 3/1975 | Crippa | |
| 3,874,506 A | 4/1975 | Hill et al. | |
| 3,912,125 A | 10/1975 | Acklin | |
| 3,943,628 A | 3/1976 | Kronman et al. | |
| 3,959,883 A | 6/1976 | Walls et al. | |
| 3,973,558 A | 8/1976 | Stouffer et al. | |
| 3,977,084 A | 8/1976 | Sloan | |
| 4,001,526 A | 1/1977 | Olson | |
| 4,004,302 A | 1/1977 | Hori | |
| 4,007,739 A | 2/1977 | Bron et al. | |
| 4,013,227 A | 3/1977 | Herrera | |
| 4,052,002 A | 10/1977 | Stouffer et al. | |
| D246,667 S | 12/1977 | Mackay et al. | |
| D246,668 S | 12/1977 | Mackay et al. | |
| 4,060,870 A | 12/1977 | Cannarella | |
| 4,075,761 A | 2/1978 | Behne et al. | |
| 4,078,558 A | 3/1978 | Woog et al. | |
| 4,094,311 A | 6/1978 | Hudson | |
| 4,108,167 A | 8/1978 | Hickman et al. | |
| 4,108,178 A | 8/1978 | Betush | |
| 4,109,650 A | 8/1978 | Peclard | |
| 4,122,845 A | 10/1978 | Stouffer et al. | |
| 4,133,971 A | 1/1979 | Boyd et al. | |
| 4,135,501 A | 1/1979 | Leunissan | |
| 4,141,352 A | 2/1979 | Ebner et al. | |
| 4,144,646 A | 3/1979 | Takemoto et al. | |
| 4,149,315 A | 4/1979 | Page, Jr. et al. | |
| 4,154,375 A | 5/1979 | Bippus | |
| 4,160,383 A | 7/1979 | Rauschenberger | |
| 4,171,572 A | 10/1979 | Nash | |
| 4,182,038 A | 1/1980 | Fleer | |
| 4,200,235 A | 4/1980 | Monschke | |
| 4,201,200 A | 5/1980 | Hubner | |
| 4,210,380 A | 7/1980 | Brzostek | |
| 4,215,476 A | 8/1980 | Armstrong | |
| 4,219,618 A | 8/1980 | Leonard | |
| 4,227,878 A | 10/1980 | Lohn | |
| 4,229,634 A | 10/1980 | Hickman et al. | |
| 4,236,889 A | 12/1980 | Wright | |
| D258,097 S | 2/1981 | Wistrand | |
| 4,248,589 A | 2/1981 | Lewis | |
| 4,249,899 A | 2/1981 | Davis | |
| 4,257,458 A | 3/1981 | Kondo et al. | |
| 4,262,799 A | 4/1981 | Perrett | |
| 4,266,934 A | 5/1981 | Pernot | |
| 4,276,023 A | 6/1981 | Phillips et al. | |
| 4,276,880 A | 7/1981 | Malmin | |
| 4,302,186 A | 11/1981 | Cammack ............ | A61H 13/005 433/80 |
| 4,303,064 A | 12/1981 | Buffa | |
| 4,303,070 A | 12/1981 | Ichikawa et al. | |
| 4,306,862 A | 12/1981 | Knox | |
| 4,315,741 A | 2/1982 | Reichl | |
| 4,319,568 A | 3/1982 | Tregoning | |
| 4,331,422 A | 5/1982 | Heyman | |
| 4,337,040 A | 6/1982 | Cammack et al. | |

(56) References Cited

U.S. PATENT DOCUMENTS 4,340,365 A 7/1982 Pisanu
4,340,368 A 7/1982 Lococo
D266,117 S 9/1982 Oberheim
4,353,694 A 10/1982 Pelerin
4,363,626 A 12/1982 Schmidt et al.
4,365,376 A 12/1982 Oda et al.
4,370,131 A 1/1983 Banko
4,374,354 A 2/1983 Petrovic et al.
4,382,167 A 5/1983 Maruyama et al.
4,382,786 A 5/1983 Lohn
4,394,546 A * 7/1983 Harumatsu ............ H01H 13/70 200/314
D270,000 S 8/1983 Ketler
4,396,011 A 8/1983 Mack et al.
4,412,823 A 11/1983 Sakai et al.
4,416,628 A 11/1983 Cammack
4,442,830 A 4/1984 Markau
4,442,831 A 4/1984 Trenary
4,452,238 A 6/1984 Kerr
4,454,866 A 6/1984 Fayen
4,512,769 A 4/1985 Kozam et al.
4,517,962 A 5/1985 Heckele
4,531,912 A 7/1985 Schuss et al.
4,531,913 A 7/1985 Taguchi
4,534,340 A 8/1985 Kerr et al.
4,552,130 A 11/1985 Kinoshita
4,561,214 A 12/1985 Inoue
D283,374 S 4/1986 Cheuk-Yiu
4,585,415 A * 4/1986 Hommann ............ A61C 17/02 604/152
4,591,777 A 5/1986 McCarty et al.
4,592,728 A 6/1986 Davis
4,602,906 A 7/1986 Grunentelder
4,607,627 A 8/1986 Leber et al.
4,613,074 A 9/1986 Schulze
4,619,009 A 10/1986 Rosenstatter
4,619,612 A 10/1986 Weber et al.
4,629,425 A 12/1986 Detsch
4,636,198 A 1/1987 Stade
4,642,037 A 2/1987 Fritchman
4,644,937 A 2/1987 Hommann
4,645,488 A 2/1987 Matukas
4,647,831 A 3/1987 O'Malley et al.
4,648,838 A 3/1987 Schlachter
4,650,475 A 3/1987 Smith et al.
4,655,198 A 4/1987 Hommann
4,669,453 A 6/1987 Atkinson et al.
4,672,953 A 6/1987 DiVito
4,673,396 A 6/1987 Urbaniak
D291,354 S 8/1987 Camens
4,716,352 A 12/1987 Hurn et al.
4,749,340 A 6/1988 Ikeda et al.
4,770,632 A 9/1988 Ryder et al.
D298,565 S 11/1988 Kohler, Jr. et al.
4,783,321 A 11/1988 Spence
4,787,845 A 11/1988 Valentine
4,787,847 A 11/1988 Martin et al.
4,798,292 A 1/1989 Hauze
4,803,974 A 2/1989 Powell
4,804,364 A 2/1989 Dieras et al.
4,810,148 A 3/1989 Aisa et al.
4,818,229 A 4/1989 Vasile
4,820,152 A 4/1989 Warrin et al.
4,821,923 A 4/1989 Skorka
4,824,368 A 4/1989 Hickman
4,826,431 A 5/1989 Fujimura et al.
4,827,551 A 5/1989 Maser et al.
4,832,683 A 5/1989 Idemoto et al.
4,854,869 A 8/1989 Lawhorn
4,861,340 A 8/1989 Smith et al.
4,862,876 A 9/1989 Lih-Sheng
4,869,720 A 9/1989 Chernack
4,880,382 A 11/1989 Moret et al.
4,886,452 A 12/1989 Lohn
4,900,252 A 2/1990 Liefke et al.
4,902,225 A 2/1990 Lohn
4,903,687 A 2/1990 Lih-Sheng
4,906,187 A 3/1990 Amadera
4,907,744 A 3/1990 Jousson
4,915,304 A 4/1990 Campani
4,925,450 A 5/1990 Imonti et al.
4,928,675 A 5/1990 Thornton
4,930,660 A 6/1990 Porteous
4,941,459 A 7/1990 Mathur
4,950,159 A 8/1990 Hansen
4,958,629 A 9/1990 Peace et al.
4,958,751 A 9/1990 Curtis et al.
4,959,199 A 9/1990 Brewer
4,961,698 A 10/1990 Vlock
4,966,551 A 10/1990 Betush
4,969,874 A 11/1990 Michel et al.
4,973,246 A 11/1990 Black
4,973,247 A 11/1990 Varnes et al.
4,973,250 A 11/1990 Milman
4,975,054 A 12/1990 Esrock
4,979,503 A 12/1990 Chernack
4,979,504 A 12/1990 Mills
4,989,590 A 2/1991 Baum et al.
4,998,880 A 3/1991 Nerli
5,013,241 A 5/1991 Von Gutfeld et al.
5,014,884 A 5/1991 Wunsch
5,019,054 A 5/1991 Clement et al.
5,027,798 A 7/1991 Primiano
5,029,576 A 7/1991 Evans, Sr.
5,033,617 A 7/1991 Hartwein et al.
5,033,961 A 7/1991 Kandler et al.
D318,918 S 8/1991 Hartwein
5,046,486 A 9/1991 Grulke et al.
5,049,071 A 9/1991 Davis et al.
5,060,825 A 10/1991 Palmer et al.
5,061,180 A 10/1991 Wiele
5,062,795 A 11/1991 Woog
5,064,168 A 11/1991 Raines et al.
D322,314 S 12/1991 Ohbayashi
5,071,346 A 12/1991 Domaas
5,082,115 A 1/1992 Hutcheson
5,082,443 A 1/1992 Lohn
5,085,317 A 2/1992 Jensen et al.
5,086,756 A 2/1992 Powell
5,095,893 A 3/1992 Rawden, Jr.
5,098,291 A 3/1992 Curtis et al.
5,098,676 A 3/1992 Brooks, Jr.
5,100,319 A 3/1992 Baum
5,117,871 A 6/1992 Gardner et al.
5,125,835 A 6/1992 Young
5,127,831 A 7/1992 Bab
5,142,723 A 9/1992 Lustig et al.
5,150,841 A 9/1992 Slivenis et al.
5,163,566 A * 11/1992 Hempel .................. A47K 1/09 211/DIG. 1
5,172,810 A 12/1992 Brewer
5,173,273 A 12/1992 Brewer
5,183,035 A 2/1993 Weir
5,197,458 A 3/1993 Ito et al.
5,197,460 A 3/1993 Ito et al.
5,199,871 A 4/1993 Young
5,203,697 A 4/1993 Malmin
5,203,769 A 4/1993 Clement et al.
5,204,004 A 4/1993 Johnston et al.
5,208,933 A 5/1993 Lustig et al.
5,215,193 A 6/1993 Dennis
5,218,956 A 6/1993 Handler et al.
5,220,914 A 6/1993 Thompson
5,228,646 A 7/1993 Raines
5,230,624 A 7/1993 Wolf et al.
5,232,687 A 8/1993 Gelmer
5,235,968 A 8/1993 Woog
5,241,714 A 9/1993 Barry
5,246,367 A 9/1993 Ito et al.
5,252,064 A 10/1993 Baum et al.
D341,200 S 11/1993 Yoshimoto
5,257,933 A 11/1993 Jousson
5,261,448 A 11/1993 Furuya et al.
D341,943 S 12/1993 Si-Hoe

(56) References Cited

U.S. PATENT DOCUMENTS 5,267,586 A 12/1993 Jankavaara
5,269,684 A 12/1993 Fischer
5,281,137 A 1/1994 Jousson
5,281,139 A 1/1994 Frank et al.
5,282,745 A 2/1994 Wiltrout et al.
5,286,192 A 2/1994 Dixon
5,286,201 A 2/1994 Yu
5,295,832 A 3/1994 Evans
5,297,962 A 3/1994 O'Connor et al.
D346,212 S 4/1994 Hosl
5,301,381 A 4/1994 Klupt
5,302,123 A 4/1994 Bechard
5,317,691 A 5/1994 Traeger
5,321,865 A 6/1994 Kaeser
5,323,770 A 6/1994 Ito et al.
5,331,704 A 7/1994 Rosen et al.
5,344,317 A 9/1994 Pacher et al.
5,346,677 A 9/1994 Risk
D351,892 S 10/1994 Wolt et al.
5,360,338 A 11/1994 Waggoner
5,368,548 A 11/1994 Jousson
5,370,534 A 12/1994 Wolt et al.
D354,168 S 1/1995 Hartwein
D354,559 S 1/1995 Knute
5,378,149 A 1/1995 Stropko
5,380,201 A 1/1995 Kawata
D356,864 S 3/1995 Woog
5,399,089 A 3/1995 Eichman ................ A61C 17/02 601/165
D358,883 S 5/1995 Vos
5,430,262 A * 7/1995 Matsui ................. H01H 25/041 200/18
5,456,672 A 10/1995 Diederich et al.
5,465,445 A 11/1995 Yeh
5,467,495 A 11/1995 Boland et al.
5,468,148 A 11/1995 Ricks
5,470,305 A 11/1995 Arnett et al.
5,474,450 A 12/1995 Chronister
5,474,451 A 12/1995 Dalrymple et al.
5,476,379 A 12/1995 Disel
5,484,281 A 1/1996 Renow et al.
5,487,877 A 1/1996 Choi
5,490,779 A 2/1996 Malmin
5,505,916 A 4/1996 Berry, Jr.
D369,656 S 5/1996 Vos
D370,125 S 5/1996 Craft et al.
5,525,058 A 6/1996 Gallant et al.
5,526,841 A 6/1996 Detsch et al.
5,540,587 A 7/1996 Malmin
5,547,374 A 8/1996 Coleman
D373,631 S 9/1996 Maeda et al.
5,554,014 A 9/1996 Becker
5,554,025 A 9/1996 Kinsel
5,556,001 A 9/1996 Weissman et al.
5,564,629 A 10/1996 Weissman et al.
D376,893 S 12/1996 Gornet
D377,091 S 12/1996 Scott, Sr.
5,613,259 A 3/1997 Craft et al.
5,616,028 A 4/1997 Hafele et al.
5,626,472 A 5/1997 Pennetta
5,634,791 A 6/1997 Matsuura et al.
5,636,987 A 6/1997 Serfaty
5,640,735 A 6/1997 Manning
D382,407 S 8/1997 Craft et al.
5,653,591 A 8/1997 Loge
5,659,995 A 8/1997 Hoffman
5,667,483 A 9/1997 Santos
D386,576 S 11/1997 Wang et al.
5,683,192 A 11/1997 Kilfoil
5,685,829 A 11/1997 Allen
5,685,851 A 11/1997 Murphy et al.
5,697,784 A 12/1997 Hafele et al.
D388,612 S 1/1998 Stutzer et al.
D388,613 S 1/1998 Stutzer et al.
D389,091 S 1/1998 Dickinson
5,709,545 A 1/1998 Johnston et al.
D390,934 S 2/1998 McKeone
5,716,007 A 2/1998 Nottingham et al.
5,718,668 A 2/1998 Arnett et al.
5,746,595 A 5/1998 Ford
5,749,726 A 5/1998 Kinsel
5,759,502 A 6/1998 Spencer et al.
5,779,471 A 7/1998 Tseng et al.
5,779,654 A 7/1998 Foley et al.
5,795,153 A 8/1998 Rechmann
5,796,325 A 8/1998 Lundell et al.
5,833,065 A 11/1998 Burgess
5,836,030 A 11/1998 Hazeu et al.
D402,744 S 12/1998 Zuege
5,851,079 A 12/1998 Horstman et al.
D403,511 S 1/1999 Serbinski
D406,334 S 3/1999 Rosenthal et al.
5,876,201 A 3/1999 Wilson et al.
5,877,463 A * 3/1999 Choi .................... H01H 25/065 200/4
D408,511 S 4/1999 Allen et al.
5,901,397 A 5/1999 Häfele et al.
5,934,902 A 8/1999 Abahusayn
D413,975 S 9/1999 Maeda
D416,999 S 11/1999 Miyamoto
D417,082 S 11/1999 Classen et al.
5,993,402 A 11/1999 Sauer et al.
6,030,215 A 2/2000 Ellion et al.
6,038,960 A 3/2000 Fukushima et al.
6,039,180 A 3/2000 Grant
6,047,429 A 4/2000 Wu
D424,181 S 5/2000 Caplow
D425,615 S 5/2000 Bachman et al.
D425,981 S 5/2000 Bachman et al.
6,056,548 A 5/2000 Neuberger et al.
6,056,710 A 5/2000 Bachman et al.
D426,633 S 6/2000 Bachman et al.
6,089,865 A 7/2000 Edgar
6,116,866 A 9/2000 Tomita et al.
6,120,755 A 9/2000 Jacobs
6,124,699 A 9/2000 Suzuki et al.
D434,500 S 11/2000 Pollock et al.
6,159,006 A 12/2000 Cook et al.
6,164,967 A 12/2000 Sale et al.
D435,905 S 1/2001 Bachman et al.
D437,049 S 1/2001 Hartwein
6,193,512 B1 2/2001 Wallace
6,193,932 B1 2/2001 Wu et al.
6,199,239 B1 3/2001 Dickerson
6,200,134 B1 3/2001 Kovac
D439,781 S 4/2001 Spore
6,217,835 B1 4/2001 Riley et al.
D441,861 S 5/2001 Hafliger
6,233,773 B1 5/2001 Karge et al.
6,234,205 B1 5/2001 D'Amelio et al.
6,237,178 B1 5/2001 Krammer et al.
6,247,929 B1 6/2001 Bachman et al.
6,280,190 B1 8/2001 Hoffman
D448,236 S 9/2001 Murray
6,293,792 B1 9/2001 Hanson
D449,884 S 10/2001 Tobin et al.
D453,453 S 2/2002 Lun
D455,201 S 4/2002 Jones
D455,203 S 4/2002 Jones
6,363,565 B1 4/2002 Paffrath
D457,949 S 5/2002 Krug
D464,799 S 10/2002 Crossman et al.
6,468,482 B1 10/2002 Frieze et al.
6,475,173 B1 11/2002 Bachman et al.
6,485,451 B1 11/2002 Roberts et al.
6,497,375 B1 12/2002 Srinath et al.
6,497,572 B2 12/2002 Hood et al.
6,502,584 B1 1/2003 Fordham
D470,660 S 2/2003 Schaber
6,532,837 B1 3/2003 Magussen, Jr.
6,558,344 B2 5/2003 McKinnon et al.
6,561,808 B2 5/2003 Neuberger et al.
D475,346 S 6/2003 McCurrach et al.
D476,743 S 7/2003 D'Silva

(56) References Cited

U.S. PATENT DOCUMENTS 6,589,477 B1 7/2003 Frieze et al.
6,602,071 B1 8/2003 Ellion et al.
6,632,091 B1 10/2003 Cise et al.
D482,451 S 11/2003 Page et al.
6,640,999 B2 11/2003 Peterson
6,647,577 B2 11/2003 Tam
6,659,674 B2 12/2003 Carlucci et al.
6,663,386 B1 12/2003 Moelsgaard
6,669,059 B2 12/2003 Mehta
D484,971 S 1/2004 Hartwein
6,681,418 B1 1/2004 Bierend
D486,573 S 2/2004 Callaghan et al.
6,689,078 B1 2/2004 Rehkemper et al.
6,699,208 B2 3/2004 Bachman et al.
6,719,561 B2 4/2004 Gugel et al.
D489,183 S 5/2004 Akahori et al.
6,739,782 B1 5/2004 Rehkemper et al.
6,740,053 B2 5/2004 Kaplowitz
D490,899 S 6/2004 Gagnon
D491,728 S 6/2004 Jimenez
D492,996 S 7/2004 Rehkemper et al.
6,761,324 B2 7/2004 Chang
6,766,549 B2 7/2004 Klupt
D495,142 S 8/2004 Berde
D495,143 S 8/2004 Berde
6,779,216 B2 8/2004 Davies et al.
6,783,004 B1 8/2004 Rinner
6,783,505 B1 8/2004 Lai
6,796,796 B2 9/2004 Segal
6,808,331 B2 10/2004 Hall et al.
D498,643 S 11/2004 Pryor
6,814,259 B1 11/2004 Foster et al.
D499,885 S 12/2004 Xi
6,835,181 B2 12/2004 Hippensteel
D500,599 S 1/2005 Callaghan
6,836,917 B2 1/2005 Blaustein et al.
6,837,708 B2 1/2005 Chen et al.
6,884,069 B2 4/2005 Goldman
6,902,337 B1 6/2005 Kuo
6,907,879 B2 6/2005 Drinan et al.
D509,585 S 9/2005 Kling et al.
D513,638 S 1/2006 Pan
D515,215 S 2/2006 Wang
D522,652 S 6/2006 Massey
7,080,980 B2 7/2006 Klupt
D529,661 S 10/2006 Schmidt
D530,010 S 10/2006 Luettgen et al.
7,117,555 B2 10/2006 Fattori et al.
D532,570 S 11/2006 Vizcarra
7,131,838 B2 11/2006 Suzuki et al.
D533,720 S 12/2006 Vu
7,147,468 B2 12/2006 Snyder et al.
7,170,497 B2 * 1/2007 Husgafvel ............. G06F 3/0219 715/830
D538,474 S 3/2007 Sheppard et al.
D548,334 S 8/2007 Izumi
D550,097 S 9/2007 Lepoitevin
D553,980 S 10/2007 VerWeyst
7,276,035 B2 10/2007 Lu
7,314,456 B2 1/2008 Shaw
D565,175 S 3/2008 Boyd et al.
7,344,510 B1 3/2008 Yande
D565,713 S 4/2008 Gao
7,367,803 B2 5/2008 Egeresi
D574,952 S 8/2008 Boyd et al.
7,414,337 B2 8/2008 Wilkinson et al.
D577,198 S 9/2008 Jimenez
D577,814 S 9/2008 Seki et al.
D581,279 S 11/2008 Oates
7,455,521 B2 11/2008 Fishburne, Jr.
7,469,440 B2 12/2008 Boland et al.
D585,132 S 1/2009 Pukall
D588,262 S 3/2009 Pukall
7,500,584 B2 3/2009 Schutz
D590,492 S 4/2009 Powell
D592,748 S 5/2009 Boulton
D595,136 S 6/2009 Canamasas Puigbo
D601,694 S 10/2009 Rocklin
D601,697 S 10/2009 Sobeich et al.
D603,708 S 11/2009 Handy
D608,430 S 1/2010 Slothower
7,670,141 B2 3/2010 Thomas et al.
7,677,888 B1 3/2010 Halm
D613,550 S 4/2010 Picozza et al.
D621,949 S 8/2010 Seki et al.
D622,928 S 9/2010 Griebel
D623,376 S 9/2010 Griebel
D625,406 S 10/2010 Seki et al.
7,814,585 B1 10/2010 Reich
D629,884 S 12/2010 Stephens
7,857,623 B2 12/2010 Grez
7,862,536 B2 1/2011 Chen et al.
7,959,597 B2 6/2011 Baker et al.
D640,872 S 7/2011 Nanda
D648,539 S 11/2011 Wai
D651,409 S 1/2012 Papentu
D651,805 S 1/2012 Hay
D653,340 S 1/2012 Goerge et al.
8,113,832 B2 2/2012 Snyder et al.
D655,380 S 3/2012 Taylor
D658,381 S 5/2012 Gebski
D658,538 S 5/2012 Korzeniowski
8,199,908 B2 6/2012 Maddocks et al.
8,217,742 B2 * 7/2012 Trudeau ................... G05G 1/10 335/206
8,220,726 B2 7/2012 Qiu et al.
D666,912 S 9/2012 Kawal
8,256,979 B2 9/2012 Hilscher et al.
D668,339 S 10/2012 Luoto
D669,169 S 10/2012 Washington et al.
8,297,534 B2 10/2012 Li et al.
D670,373 S 11/2012 Taylor et al.
D670,958 S 11/2012 Picozza et al.
D671,637 S 11/2012 Gebski et al.
D672,018 S 12/2012 Bucher
8,366,024 B2 2/2013 Leber et al.
8,403,577 B2 3/2013 Khoshnevis
8,403,665 B2 3/2013 Thomas et al.
8,408,483 B2 * 4/2013 Boyd ................... A61C 1/0084 239/69
8,418,300 B2 4/2013 Miller et al.
D686,311 S 7/2013 Mori
D694,378 S 11/2013 Bates
D694,398 S 11/2013 Taylor
D700,343 S 2/2014 Liu
D702,819 S 4/2014 Garland
D702,821 S 4/2014 Garland
D707,350 S 6/2014 Woodard
D709,183 S 7/2014 Kemlein
D714,929 S 10/2014 Kim et al.
D714,930 S 10/2014 Kim et al.
D717,412 S 11/2014 Bucher
D717,427 S 11/2014 Kim
D718,855 S 12/2014 Kim et al.
D723,387 S 3/2015 Fath
D725,770 S 3/2015 Kim et al.
D731,640 S 6/2015 Kim et al.
D735,305 S 7/2015 Obara
D740,936 S 10/2015 Klm et al.
D745,329 S 12/2015 Ong
D746,975 S 1/2016 Schenck
D747,464 S 1/2016 Taylor
D754,330 S 4/2016 Kim et al.
D756,122 S 5/2016 Taylor
D764,051 S 8/2016 Wang
D766,423 S 9/2016 Kim et al.
D772,396 S 11/2016 Kim et al.
D772,397 S 11/2016 Kim et al.
D774,651 S 12/2016 Kaib
D776,253 S 1/2017 Li
D782,326 S 3/2017 Fath
D782,656 S 3/2017 Au
D786,422 S 5/2017 Au
9,642,677 B2 5/2017 Luettgen et al.

(56) References Cited

U.S. PATENT DOCUMENTS

D788,907 S 6/2017 Kim
D797,278 S 9/2017 Uchida ........................ D24/111
D798,440 S 9/2017 Kim
D802,119 S 11/2017 Kim
D809,650 S 2/2018 Kim
2002/0090252 A1 7/2002 Hall et al.
2002/0108193 A1 8/2002 Gruber
2002/0119415 A1 8/2002 Bailey
2002/0152565 A1 10/2002 Klupt
2003/0060743 A1 3/2003 Chang
2003/0098249 A1 5/2003 Rollock
2003/0162146 A1 8/2003 Shortt et al.
2003/0198580 A1* 10/2003 Chen ....................... C01B 13/11 422/186.07
2003/0204155 A1 10/2003 Egeresi
2003/0213075 A1 11/2003 Hui et al.
2004/0045107 A1 3/2004 Egeresi
2004/0076921 A1 4/2004 Gofman et al.
2004/0122377 A1 6/2004 Fischer et al.
2004/0126730 A1 7/2004 Panagotacos
2004/0180569 A1 9/2004 Chiou
2004/0209222 A1 10/2004 Snyder
2005/0049620 A1 3/2005 Chang
2005/0064371 A1 3/2005 Soukos et al.
2005/0101894 A1 5/2005 Hippensteel
2005/0102773 A1 5/2005 Obermann et al.
2005/0144745 A1 7/2005 Russell
2005/0177079 A1 8/2005 Pan
2005/0271531 A1 12/2005 Brown et al.
2006/0008373 A1 1/2006 Schutz
2006/0010624 A1 1/2006 Cleland
2006/0026784 A1 2/2006 Moskovich et al.
2006/0057539 A1 3/2006 Sodo
2006/0078844 A1 4/2006 Goldman et al.
2006/0079818 A1 4/2006 Yande
2006/0207052 A1 9/2006 Tran
2007/0082316 A1 4/2007 Zhadanov et al.
2007/0082317 A1 4/2007 Chuang
2007/0113360 A1 5/2007 Tsai
2007/0202459 A1 8/2007 Boyd et al.
2007/0203439 A1 8/2007 Boyd et al.
2007/0254260 A1 11/2007 Alden
2008/0023313 A1 1/2008 Sack et al.
2008/0189951 A1 8/2008 Molema et al.
2008/0213719 A1 9/2008 Giniger et al.
2008/0253906 A1 10/2008 Strong
2009/0070949 A1 3/2009 Sagel et al.
2009/0071267 A1 3/2009 Mathus et al.
2009/0082706 A1 3/2009 Shaw
2009/0124945 A1 5/2009 Reich et al.
2009/0139351 A1 6/2009 Reichmuth
2009/0163839 A1 6/2009 Alexander
2009/0184015 A1 7/2009 Ruppert ................. A46B 17/02 206/362.2
2009/0188780 A1 7/2009 Watanabe
2009/0281454 A1 11/2009 Baker et al.
2010/0010524 A1 1/2010 Barrington
2010/0015566 A1 1/2010 Shaw
2010/0049177 A1 2/2010 Boone, III et al.
2010/0084249 A1 4/2010 Bandy et al.
2010/0108476 A1 5/2010 Trudeau ............... G01D 11/245 200/14
2010/0190132 A1 7/2010 Taylor et al.
2010/0239998 A1 9/2010 Snyder et al.
2010/0261134 A1 10/2010 Boyd et al.
2010/0261137 A1 10/2010 Boyd et al.
2010/0326536 A1 12/2010 Nan
2010/0330527 A1 12/2010 Boyd et al.
2011/0027749 A1 2/2011 Syed
2011/0076090 A1 3/2011 Wu et al.
2011/0097683 A1 4/2011 Boyd et al.
2011/0139826 A1 6/2011 Hair et al.
2011/0144588 A1 6/2011 Taylor et al.
2011/0184341 A1 7/2011 Baker et al.
2011/0307039 A1 12/2011 Cornell
2012/0021374 A1 1/2012 Cacka et al.
2012/0045730 A1 2/2012 Snyder et al.
2012/0064480 A1 3/2012 Hegemann
2012/0077145 A1 3/2012 Tsurukawa
2012/0112018 A1 5/2012 Barry ....................... A47K 1/09 248/121
2012/0141952 A1 6/2012 Snyder et al.
2012/0179118 A1 7/2012 Hair
2012/0189976 A1 7/2012 McDonough et al.
2012/0266396 A1 10/2012 Leung
2012/0277663 A1 11/2012 Millman et al.
2012/0277677 A1 11/2012 Taylor et al.
2012/0277678 A1 11/2012 Taylor et al.
2012/0279002 A1 11/2012 Sokol et al.
2012/0295220 A1 11/2012 Thomas et al.
2013/0089832 A1 4/2013 Lee
2013/0125327 A1 5/2013 Schmid .............. A46B 15/0044 15/105
2013/0295520 A1 11/2013 Hsieh
2014/0106296 A1 4/2014 Woodard et al.
2014/0193774 A1 7/2014 Snyder et al.
2014/0259474 A1 9/2014 Sokol et al.
2014/0272769 A1 9/2014 Luettgen et al.
2014/0272782 A1 9/2014 Luettgen et al.
2014/0352088 A1 12/2014 Wu
2015/0004559 A1 1/2015 Luettgen et al.
2015/0072303 A1 3/2015 Boyd et al.
2015/0147717 A1 5/2015 Taylor ................ A61C 17/0205 433/80
2015/0173850 A1 6/2015 Garrigues ............ A61C 1/0092 433/80
2015/0182319 A1* 7/2015 Wagner .................. A61C 17/20 132/308
2016/0100921 A1 4/2016 Ungar
2016/0151133 A1 6/2016 Luettgen et al.
2016/0296078 A1* 10/2016 Beckerman .............. A46B 9/04
2017/0049530 A1 2/2017 Cacka
2017/0239132 A1 8/2017 Luettgen et al.
2017/0252251 A1 9/2017 Williams et al.
2018/0140400 A1 5/2018 Hoshino ............ A61C 17/0202
2018/0140401 A1* 5/2018 Hoshino ................ A61C 17/14
2018/0168785 A1 6/2018 Wagner et al.

FOREIGN PATENT DOCUMENTS

CN 101825913 9/2010
CN 203089435 U 7/2013
CN 203829079 9/2014
CN 203953860 11/2014
CN 204049908 12/2014
CN 205073056 3/2016
CN 205094654 3/2016
DE 1466963 5/1969
DE 2019003 11/1971
DE 2409752 9/1975
DE 2545936 4/1977
DE 2714876 10/1978
DE 2910982 2/1980
DE 3346651 7/1985
EP 0023672 7/1980
EP 0515983 2/1992
EP 1825827 8/2007
EP 2253359 11/2010
EP 8323384 A1 5/2018
FR 2556954 6/1985
FR 2654627 5/1991
GB 838564 6/1960
GB 1182031 2/1970
GB 1456322 11/1976
GB 2018605 10/1979
JP 55131711 9/1980
JP 2-134150 5/1990
JP H02-134150 A 5/1990
JP 11-56879 3/1999
JP 2006140049 A 6/2006
JP 2009-39455 2/2009
JP 4471817 6/2010
JP 2016138379 8/2016

(56) References Cited

FOREIGN PATENT DOCUMENTS

| | | | |
|---|---|---|---|
| KR | 10-2010-0025661 | | 3/2010 |
| KR | 20120126265 | | 11/2012 |
| WO | WO95/016404 | | 6/1995 |
| WO | 01/10327 | A1 | 2/2001 |
| WO | WO01/10327 | | 2/2001 |
| WO | WO04/021958 | | 3/2004 |
| WO | WO04/039205 | | 5/2004 |
| WO | WO2004/060259 | | 7/2004 |
| WO | WO2004/062518 | | 7/2004 |
| WO | WO2008/070730 | | 6/2008 |
| WO | WO2008/157585 | | 12/2008 |
| WO | 2010134051 | A1 | 11/2010 |
| WO | WO2013/124691 | | 8/2013 |
| WO | 2014160051 | | 10/2014 |

OTHER PUBLICATIONS

The Right Tool, Electron Fusion Devices, Inc., 2 pages, at least as early as Feb. 1991.
Japanese Packaging, 2 pages, at least as early as Dec. 2002.
Japanese Instruction Brochure, 20 pages, at least as early as Dec. 2002.
Brochure: Woog International, "You have a 98% chance of getting gum disease. Unless you read this.", Lancaster, Pennsylvania, 5 pages, Feb. 1987.
Brochure: Woog International, "We put the control of home dental care back into the hands of the professional", Lancaster, Pennsylvania, 2 pages, Feb. 1987.
Brochure: Woog International, "Products at a Glance: Home Dental Care System" Woog Orajet, 3 pages, at least as early as Dec. 18, 1998.
Website: http://www.just4teeth.com/product/Panasonic/Panasonic_Portable_Irrigator.htm, 2 pages, at least as early as Jun. 20, 2003.
Website: http://www.videodirectstore.com/store/merchant.mv?Screen=PROD&Product_Code=EW1'...", 2 pages, at least as early as Jun. 20, 2003.
Website: http://products.consumerguide.com/cp/family/review/index.cfm/id/18742, 2 pages, at least as early as Jun. 20, 2003.
Website: http://www.racekarteng.com/images/walbroparts.gif and http://www.muller.net/mullermachine/docs/walbro1.html, 4 pages, at least as early as Jun. 20, 2003.
European Search Report, EPO Application No. 07250799.9, Jul. 5, 2007.
European Search Report, EPO Application No. 07252693.2, 14 pages, Apr. 28, 2008.
European Examination Report, EPO Application No. 07250799.9, Feb. 5, 2009.
International Search Report, Application No. PCT/US2010/028180, 2 pages, May 18, 2010.
International Search Report, PCT/US2010/060800, 2 pages, Feb. 11, 2011.
International Search Report, PCT/US2011/052795, 10 pages, Jan. 17, 2012.
Waterpik SinuSense Website: http://www.insightsbyapril.com/2012/03/waterpik-natural-remedy-for-sinus.html, 8 pages, retrieved on May 31, 2012.
Website: https://www.waterpik.com/about-us/, 3 pages.
Waterpik WP350W Oral Irrigator. Dentist.net. Copyright date 2013. Date accessed: Mar. 30, 2017, 2 pages <http://www.dentalhoo.com/waterpik-wp350.asp>.
IPik Portable Oral Irrigator. AliExpress. Date reviewed: Oct. 5, 2016. <https://www.aliexpress.com/...e-Oral-Care-Product-Nasal-Irrigator-Tooth-Flosser-Water/1525541997.html?aff_platform=aat&cpt=1490913714609&sk=yfAeyJa&aft_trace_key=c5a300c4f02e46d08c042f5292e1762f-1490913714609-07517-yfAeyJa>, 18 pages.
Brite Leafs Professional Portable 2-in-1 Nasal Sinus & Oral Irrigator. Brite Leafs. Copyright date 2012, <http://www.briteleats.com/product6.html> , 1 page.
AliExpress. Date reviewed: Jan. 12, 2017. <https://www.aliexpress.com/Item/Cordless-Water-Floss-Portable-Oral-Irrigator-Dental-Water-Flosser-Waterplc-Whatplck-Dental-Water-Plc-Whater-Pick/32769416341.html?spm=2114.40010308.4.75.Owuzfj>.
Suvo. "Hellcal Gears vs Spur Gears—Advantages and Disadvantages Compared." Brighthub Engineering, Aug. 18, 2010, www.brighthubengineering.com/manufacturing-technology/33535-helical-gears-vs-spur-gears/., 7 pages.
Waterpik ADA Accepted WP-663, posted at amazon.com, earliest date reviewed on Feb. 6, 2014, [online], acquired on Feb. 12, 2018. Available from Internet, <URL: https://www.amazon.com/Waterpik-Accepted-WP-663-Aquarius-Flosser/dp/B072JFVXSY/ref=cm_cr_arp_d_product_top?ie=UTF8&th=1> (Year: 2014).
Waterpik Classic Professional Water Flosser, WP-72, posted at amazon.com, earllest date reviewed on Mar. 5, 2016, [online], acquired on Feb. 23, 2018. Available from Internet, <URL: https://www.amazon.com/Waterpik-Classic-Professional-Flosser-WP-72/dp/B00HFQQOU6/ref=cm_cr_arp_d_product_top?le=UTF8> (Year: 2016).

* cited by examiner

ORAL IRRIGATOR ASSEMBLY

CROSS REFERENCE TO RELATED APPLICATIONS

This application is a divisional of U.S. patent application Ser. No. 15/843,911 filed 15 Dec. 2017 which claims the benefit of U.S. Provisional Patent Application No. 62/434,993 filed 15 Dec. 2016, both of which are hereby incorporated by reference herein in their entireties.

TECHNICAL FIELD

The present disclosure relates generally to health and personal hygiene equipment and more particularly, to oral irrigators.

BACKGROUND

Oral irrigators typically are used to clean a user's teeth and gums by discharging a pressurized fluid stream into a user's oral cavity. The fluid impacts the teeth and gums to remove debris. Countertop oral irrigator units include a large reservoir that connects to a base unit housing a pump and other internal components. The reservoir on these types of units may be wide and cumbersome for a user to remove to refill, such that both a user's hands might be needed to manipulate the reservoir. In addition, these units may have multiple adjustment levers and knobs, which may contribute to a larger footprint. In some cases, the fluid tube coupling the base unit to the oral irrigator handle may become inadvertently tangled and have a look that is unorganized and unpleasing to a user when the irrigator handle is stored. The fluid tube may also interfere with the storage of the oral irrigator.

The information included in this Background section of the specification, including any references cited herein and any description or discussion thereof, is included for technical reference purposes only and is not to be regarded subject matter by which the scope of the disclosure is to be bound.

SUMMARY

The present disclosure provides an oral irrigator with magnetic attachment, as described below and defined in the accompanying claims. In one embodiment, an oral irrigator assembly may include a base including a pressure assembly, a pump assembly, a motor assembly, and a cradle. The pressure assembly may include a control valve and may be fluidly connected to the pump assembly. The motor assembly may be electrically connected to the pump assembly. The oral irrigator assembly may include a reservoir with a lid adjustably coupled to the reservoir, the reservoir positioned adjacent to the base and fluidly coupled to the pressure assembly. The oral irrigator assembly may include a control assembly with a push button at least partially surrounded by a rotating or sliding knob. The push button may be configured to engage a power button to electrically connect the motor assembly to the pump assembly. The knob may be coupled to the control valve. The oral irrigator assembly may include an oral irrigator handle fluidly coupled to the pump assembly, the pressure assembly, and the reservoir. The oral irrigator handle may be adjustably coupled to the base at the cradle.

Another embodiment of the present disclosure includes an oral irrigator assembly. The oral irrigator assembly may include a base unit and an oral irrigator handle. The base unit may include a first positioning feature. The oral irrigator handle may include a second positioning feature. The second positioning feature of the oral irrigator handle may correspond with the first positioning feature of the base unit to removably couple the oral irrigator handle to the base unit. The oral irrigator handle may be removably coupled to the base unit at any one of a plurality of desired positions relative to the base unit.

Another embodiment of the present disclosure includes a control assembly for an oral irrigator assembly. The control assembly may include a first element arranged to selectively alter a first operating state of the oral irrigator assembly. The control assembly may include a second element arranged to rotate at least partially about the first element to selectively alter a second operating state of the oral irrigator assembly.

Another embodiment of the present disclosure includes an oral irrigator assembly. The oral irrigator assembly may include a base including a pressure assembly, a fluid reservoir removably coupled to the base, an oral irrigator handle fluidly coupled to the fluid reservoir and the pressure assembly, and a control assembly including a push button at least partially surrounded by a knob. The oral irrigator handle may be adjustably coupled to the base via a magnetic attachment. The push button may be arranged to engage a power button to turn the oral irrigator assembly on and off. The knob may be coupled to the pressure assembly to adjust at least one of a pressure and a volume of a fluid expelled through the oral irrigator handle upon movement of the knob.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present disclosure as defined in the claims is provided in the following written description of various embodiments of the disclosure and illustrated in the accompanying drawings.

DETAILED DESCRIPTION

Figure 1:
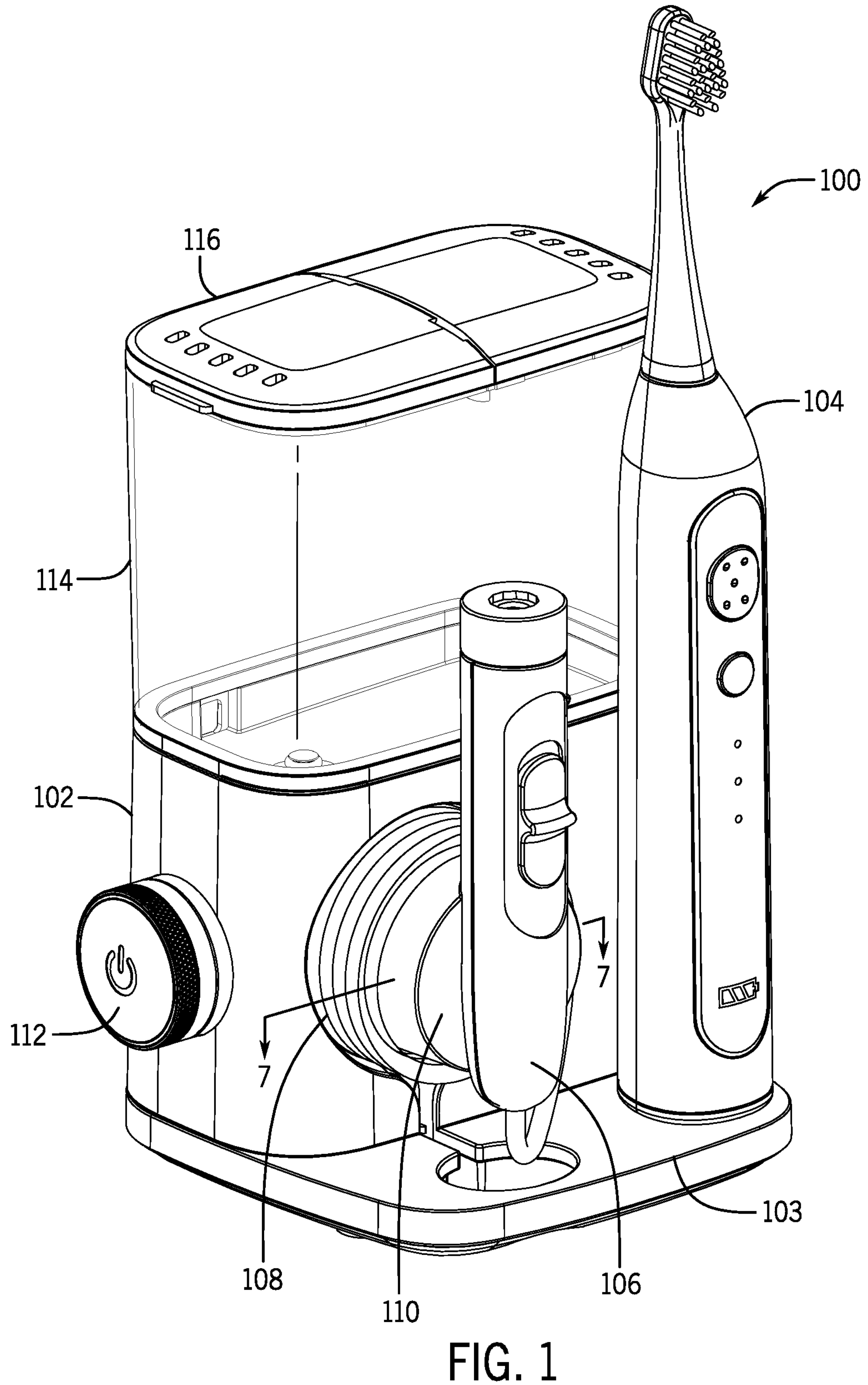
FIG. 1 is an isometric view of an embodiment of an oral irrigator assembly.

In some examples, an oral irrigator assembly may include a control assembly having first and second elements operable to alter first and second operating states of the oral irrigator assembly. The first and second elements may be positioned for compact operation. For example, the second element may be arranged to rotate at least partially about the first element to reduce the overall size of the control assembly compared to some traditional designs. The first element may control a first function of the oral irrigator assembly. The second element may control a second function of the oral irrigator assembly. The first element may be a push button. The second element may be a rotating or sliding knob. The push button may be selectively depressed to turn the oral irrigator assembly on and off. The oral irrigator assembly may include a control valve coupled to the knob. Selective movement of the knob may vary the volume and/or pressure of a fluid expelled through an oral irrigator handle. The first and second elements may move in first and second directions. For instance, the first element may move axially along an axis about which the second element at least partially rotates. Alternatively, the first and second elements may move axially along generally orthogonal directions.

In some examples, the oral irrigator handle may include a homing feature that assists a user in positioning the oral irrigator handle adjacent to a base unit. In one example, the homing feature of the oral irrigator handle may assist a user in positioning the handle within or adjacent a cradle extending from the base unit. The cradle may include a complementary homing feature such that the handle easily aligns to a correct position adjacent to the cradle, such as cantilevered off an end face of the cradle. In this manner, the homing features may make placement of the handle in a correct position easier for the user.

In addition to facilitating easy placement of the handle in a correct position, the homing feature(s) may also allow the base unit to include a slimmer profile compared to some traditional designs. For instance, some traditional designs include a C-clamp type structure to hold an oral irrigator handle. The homing feature(s) of the present disclosure, however, allow the traditional C-clamp holding structure to be removed from the base unit, thereby allowing the base unit to have a more compact shape. The homing feature(s) may also allow greater freedom in designing the oral irrigator handle. For example, without the need of designing the handle to fit within a C-clamp type structure, the handle may be designed with shapes that are more aesthetically appealing and/or more comfortable to, and/or easier to manipulate by, a user compared to traditional designs. In particular, the handle may be more uniform in cross-section with less taper along its length compared to traditional designs.

The homing features may be any suitable mechanism or assembly operable to quickly and easily couple the oral irrigator handle to the base unit. For example, the homing features may include complimentary magnetic materials or devices to magnetically couple the oral irrigator handle to the base unit in one or more relative positions. The magnetic materials or devices may be positioned such that magnetic attachment of the oral irrigator handle to the base unit automatically aligns the oral irrigator handle relative to the base unit. For instance, the magnetic coupling of the oral irrigator handle to the base unit may vertically align the oral irrigator handle along the base unit. Additionally or alternatively, the magnetic coupling of the oral irrigator handle to the base unit may position the oral irrigator handle at one or more predetermined or desired vertical positions relative to the base unit. For instance, the magnetic coupling of the oral irrigator handle to the base unit may position the oral irrigator handle in one of a plurality of set positions along the base unit. Alternatively, the magnetic coupling of the oral irrigator handle to the base unit may position the oral irrigator handle at any desired position along the base unit based on user preference. In such examples, the positioning of the oral irrigator handle may be restrained only by the size of the homing features themselves. For example, the homing features may define minimum and maximum spacing relative to the base unit, with the oral irrigator handle able to be positioned at any location within the minimum and maximum positions.

FIG. 1 is an isometric view of an oral irrigator assembly 100. FIG. 1 shows the oral irrigator assembly 100 with a base 102 and a reservoir 114 coupled to the base 102. The reservoir 114, which may be referred to as a fluid reservoir, may be removably or fixedly coupled to the base 102. The reservoir 114 may be coupled to the base 102 in many configurations. For example, the reservoir 114 may be positioned at least partially on top of the base 102. As shown in FIG. 1, a toothbrush 104 and an oral irrigator handle 106 may be releasably coupled to the base 102. For instance, at least one of the toothbrush 104 and the oral irrigator handle 106 may rest on the base 102, may be secured to a vertical face or wall of the base 102, or the like, or any combination thereof. The oral irrigator handle 106 may be coupled to a tube 108 that is stored around a tube nest 110. The tube nest 110 may be coupled to the base 102. The base 102, which may be referred to as a base unit, may also have a control assembly 112. The reservoir 114 may have a lid 116. In some examples, the toothbrush 104 is removable from the base 102. The oral irrigator handle 106 may be removably coupled to the base 102 at the tube nest 110, and fluidly connected to the reservoir 114 through the tube 108. The oral irrigator handle 106 may be connected to a jet tip 107 (shown in FIG. 16). As explained below, the oral irrigator handle 106 may be adjustably coupled the base 102.

Figure 2:
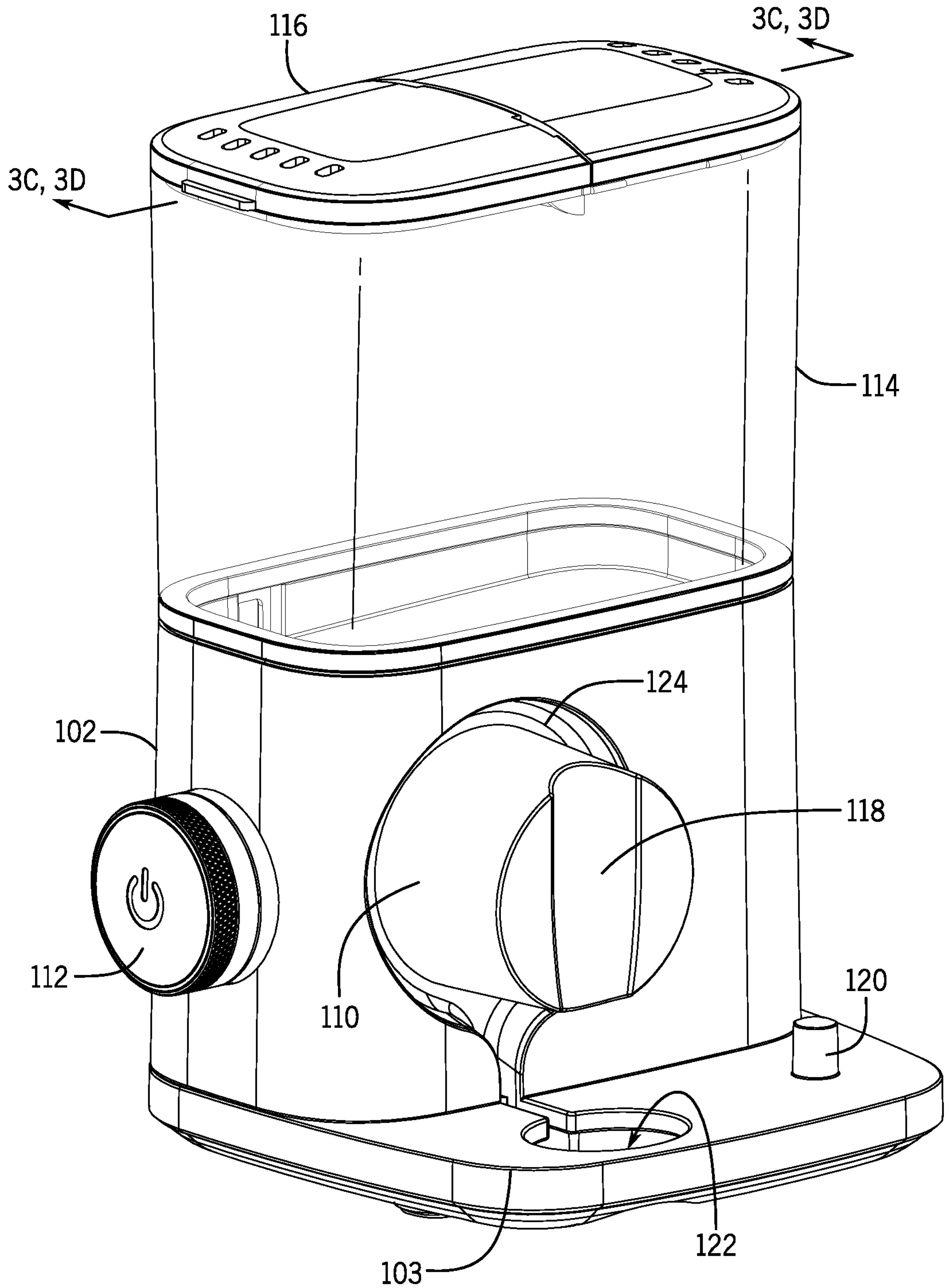
FIG. 2 is an isometric view of a base unit and a reservoir of the oral irrigator assembly of FIG. 1.

FIG. 2 is an isometric view of the oral irrigator assembly 100 of FIG. 1, with the toothbrush 104, oral irrigator handle 106, and tube 108 removed for illustration purposes. As shown in FIG. 2, the tube nest 110 may include a cradle 118 configured to hold the oral irrigator handle 106. In some examples, the cradle 118 may include a shape complementary to that of the oral irrigator handle 106 for complementary engagement therewith. For instance, the cradle 118 may be curved to complement or generally complement an outer profile shape of the oral irrigator handle 106. In some examples, the base 102 may have a tube routing aperture 122 formed in an extension 103 of the base 102. The extension 103 may be generally rectangular shaped and may horizontally extend away from a lower portion of the main body of the base 102. In such examples, the extension 103 may define a shelf on which the toothbrush 104 and/or oral irrigator handle 106 may be stored.

Figure 16:
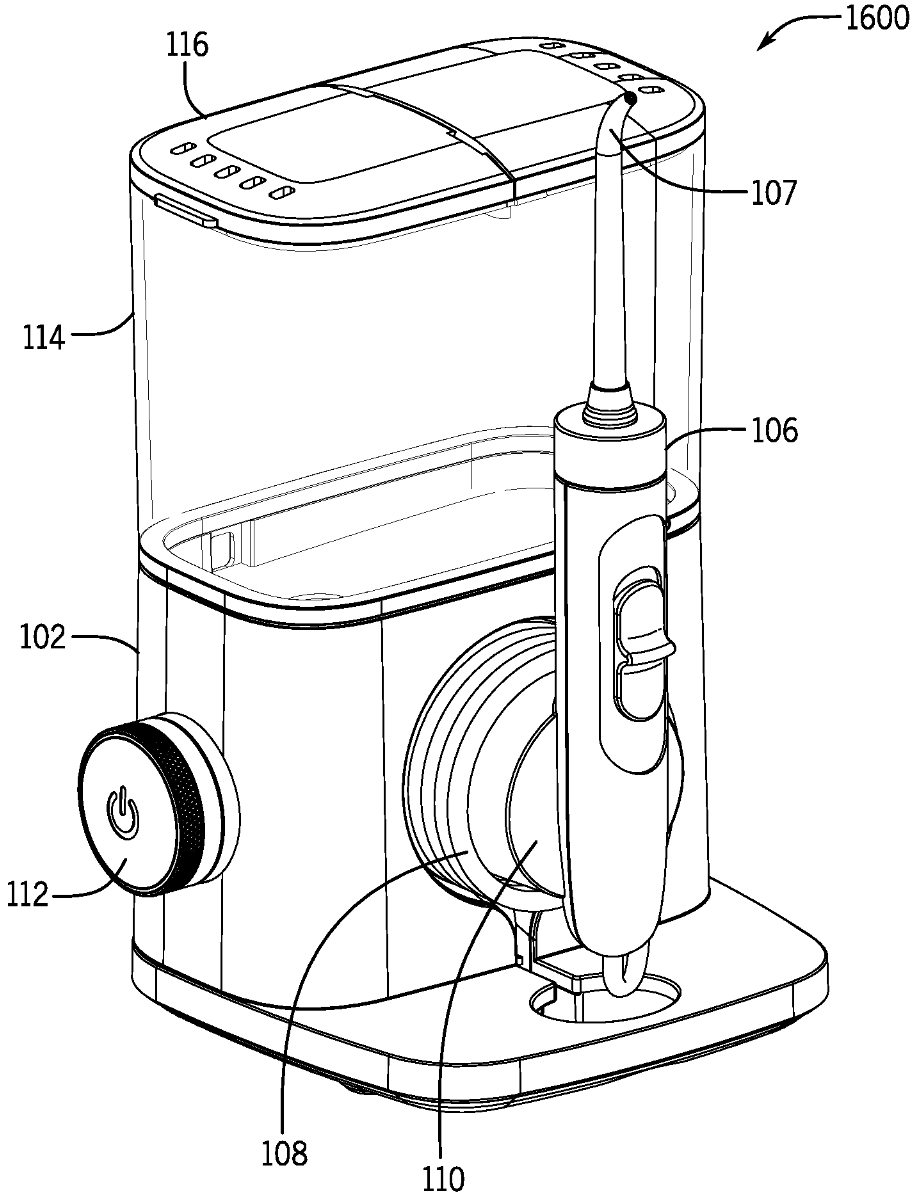
FIG. 16 is an isometric view of another embodiment of an oral irrigator assembly.

FIG. 16 is an isometric view of another embodiment of an oral irrigator assembly 1600. Unless otherwise noted, the oral irrigator assembly 1600 of FIG. 16 is configured similarly to the oral irrigator assembly 100 described herein. For instance, with reference to FIG. 16, the oral irrigator assembly 1600 may differ from the oral irrigator assembly 100 of FIGS. 1 and 2 in that the oral irrigator assembly 1600 of FIG. 16 does not include toothbrush 104. In all or substantially all other aspects, however, the oral irrigator assembly 1600 may be similar to oral irrigator assembly 100.

Figure 3A:
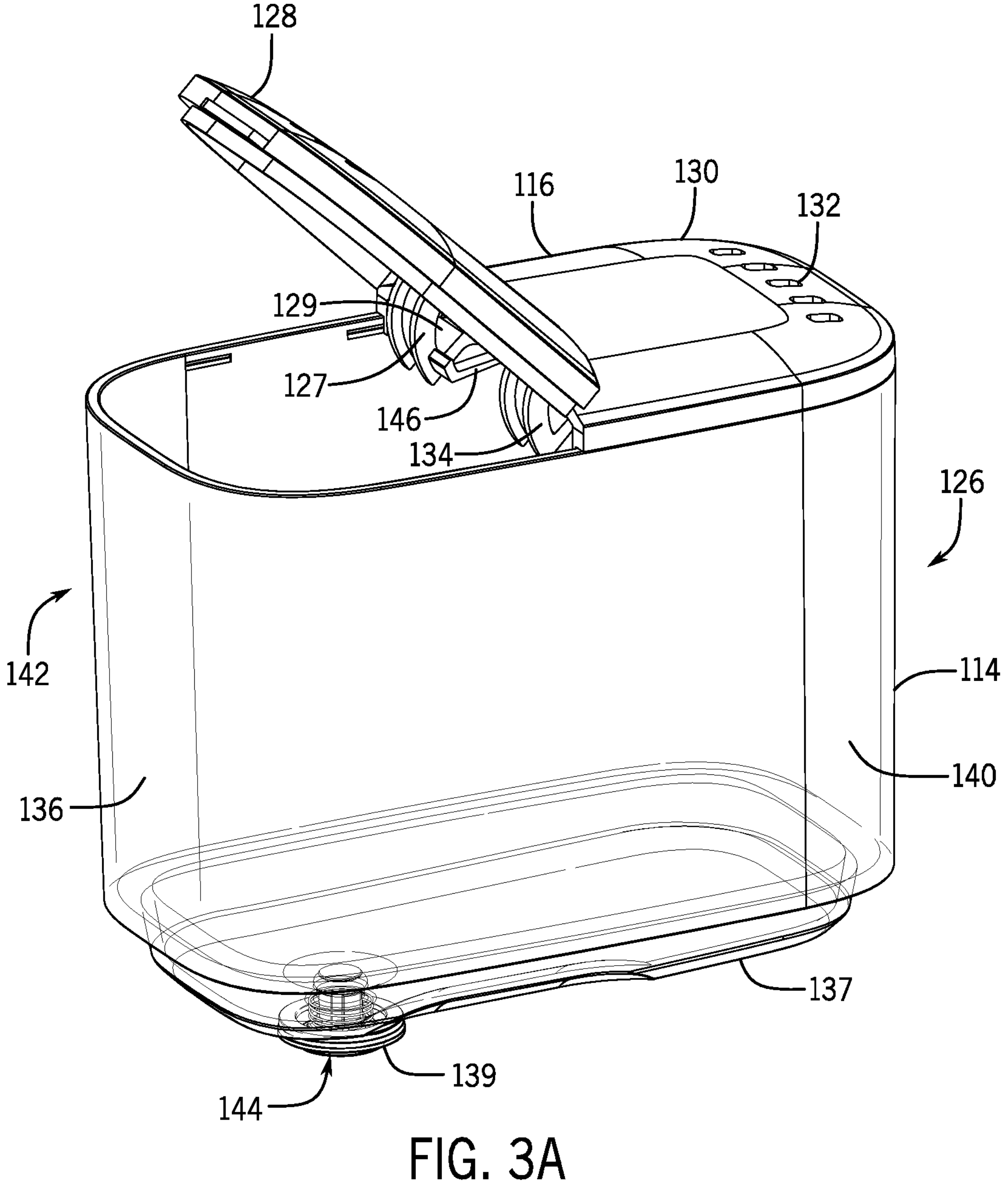
FIG. 3A is an isometric view of the reservoir with a lid in a first open position.
Figure 3B:
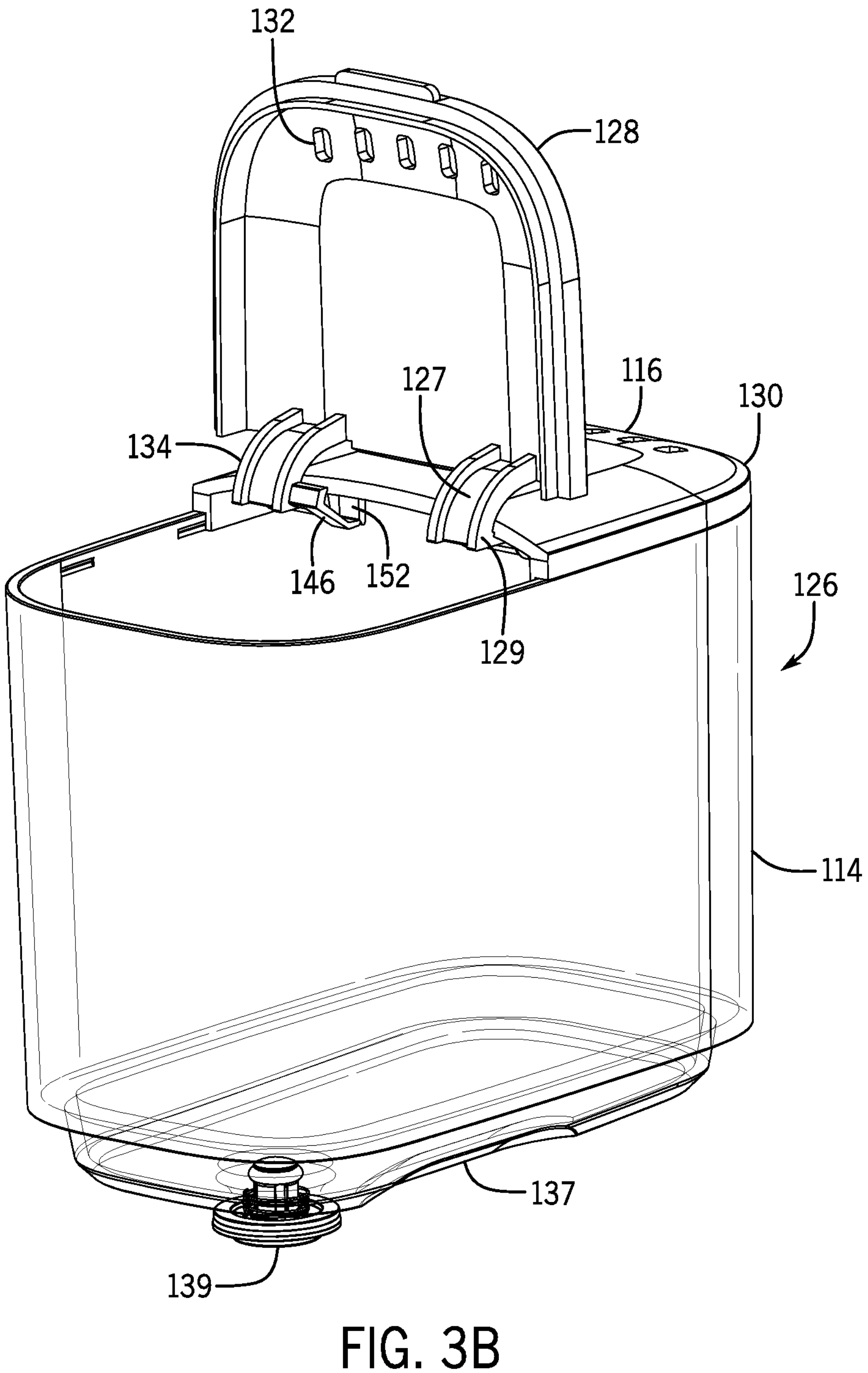
FIG. 3B is an isometric view of the reservoir with the lid in a second open position.
Figure 3C:
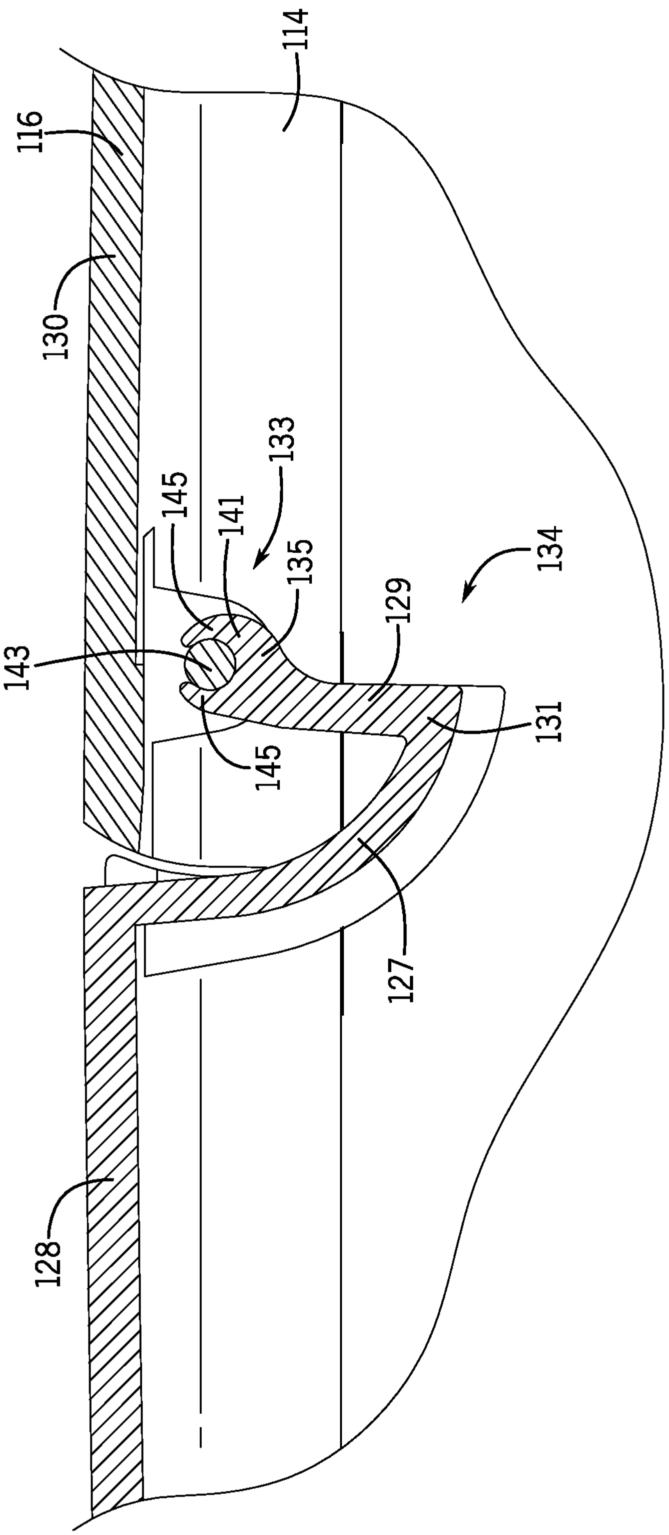
FIG. 3C is a cross-sectional view of the lid taken along line 3C-3C of FIG. 2.
Figure 3D:
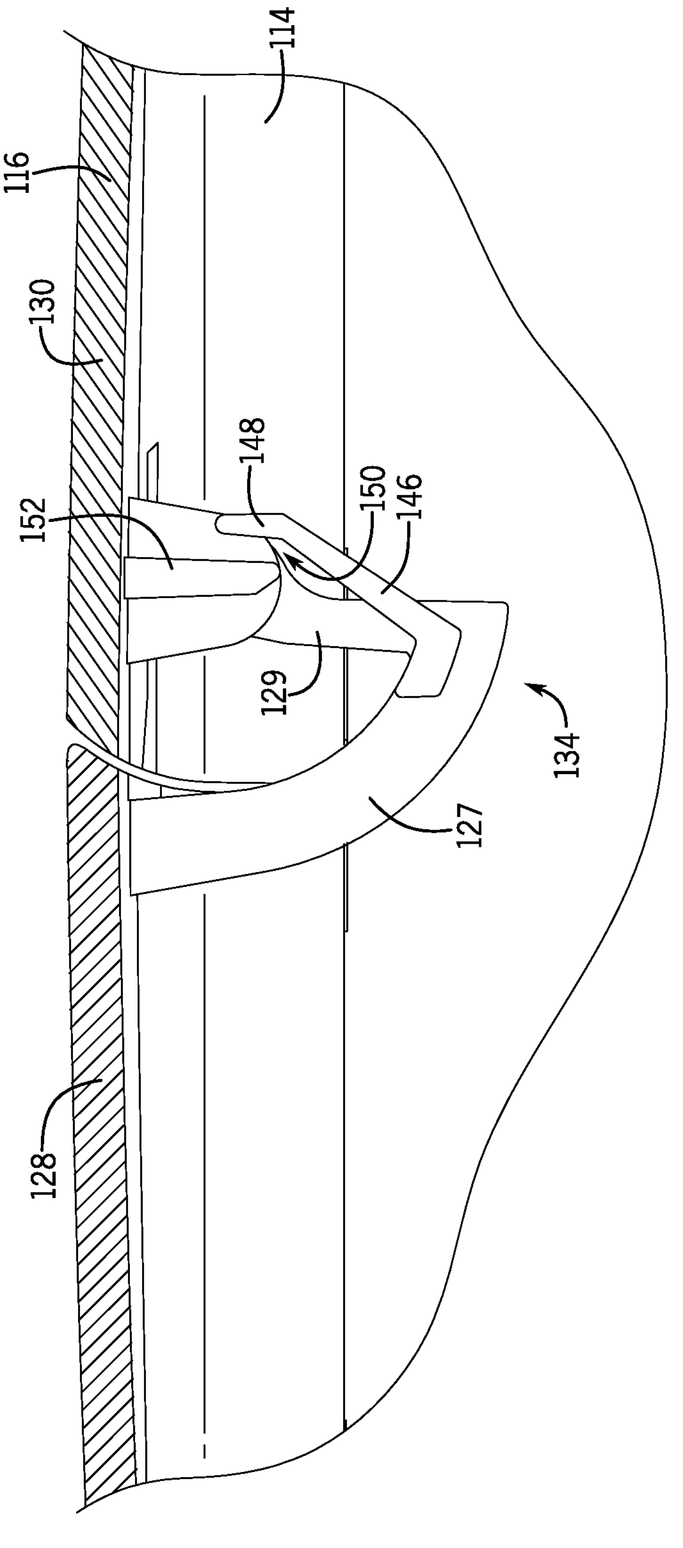
FIG. 3D is a cross-sectional view of the lid taken along line 3D-3D of FIG. 2.

FIGS. 3A and 3B show a reservoir assembly 126 with the lid 116 in different open positions. FIG. 3A is an isometric view of the reservoir 114 with the lid 116 in a first open position. FIG. 3B is an isometric view of the reservoir 114 with a lid 116 in a second open position. FIGS. 3C and 3D are cross-sectional views of a hinge structure of the lid 116. Referring to FIGS. 3A-3D, the lid 116 may have an adjustable portion 128 that may rotate with respect to a fixed portion 130 about hinges 134 that pivotally couple the adjustable portion 128 and the fixed portion 130 together. Both the adjustable portion 128 and the fixed portion 130 may have vents 132. In some examples, the fixed portion 130 may be adjustably secured to the reservoir 114, while the adjustable portion 128 may couple with the reservoir 114 when the adjustable portion 128 is in a closed position, as shown in FIGS. 1 and 2.

Referring to FIGS. 3C and 3D, the hinges 134 may be defined as first and second links 127, 129 connected together. Depending on the particular application, the first and second links 127, 129 may be formed integrally as a single element, or may be separate elements connected together, either fixedly or otherwise. The first link 127 may be attached to the adjustable portion 128 of the lid 116. As shown in FIGS. 3C and 3D, the second link 129 may extend from a distal end 131 of the first link 127. The second link 129 may extend at an angle to the first link 127. The angle between the first and second links 127, 129 may be an acute angle, a 90° angle, or an obtuse angle to allow the adjustable portion 128 to pivot relative to the fixed portion 130. The angle between the first and second links 127, 129 may also define a fully opened position of the adjustable portion 128. For instance, the adjustable portion 128 may be moved away from the reservoir 114 until the second link 129 of the hinge 134 contacts a portion of the fixed portion 130 to define a fully opened position of the lid 116. In such examples, a larger angle between the first and second links 127, 129 may allow the adjustable portion 128 to move further away from the reservoir 114. In like manner, a smaller angle between the first and second links 127, 129 may limit the amount of rotation of the adjustable portion 128 away from the reservoir 114.

With continued reference to FIGS. 3C and 3D, a pivot assembly 133 may be coupled to the fixed portion 130 to which the second link 129 is rotatably coupled. For example, a distal end 135 of the second link 129 may define a clip structure 141 sized and shaped to surround a majority of a pivot shaft 143 of the pivot assembly 133. In one example, the clip structure 141 may include opposing sections or fingers 145 defining a crescent shape to at least partially surround the pivot shaft 143, though other suitable configurations are contemplated. The hinge 134 may rotate about the pivot shaft 143 to move the adjustable portion 128 between open and closed positions.

In some examples, the lid 116 may include structure operable releasably hold the adjustable portion 128 in an open position. For example, as shown in FIG. 3D, a tab 146 may extend from the first link 127 and/or the second link 129 of the hinge 134. A distal end 148 of the tab 146 may be curved or angled to define a seat 150. With continued reference to FIG. 3D, a post 152 may extend from the fixed portion 130. As the adjustable portion 128 moves relative to the fixed portion 130, the tab 146 may move relative to the post 152 until the post 152 engages the seat 150 at which point further movement of the tab 146 relative to the post 152 may be limited (see FIG. 3B). In this position, the adjustable portion 128 of the lid 116 may be releasably held in place to allow easy filling of the reservoir 114.

The reservoir 114 may be formed with two opposing generally planar sides 136, 138 that are generally normal to a generally planar front face 140 that opposes a generally planar rear face 142. In some examples, the sides 136, 138 have a width that is smaller than a width of each of the front face 140 and the rear face 142. A bottom 137 of the reservoir 114 may be configured with a sealable port 139 to couple to a valve assembly 144 to fluidly connect the reservoir 114 with a pressure assembly and a pump assembly in the base 102, as described more fully below.

Figure 4:
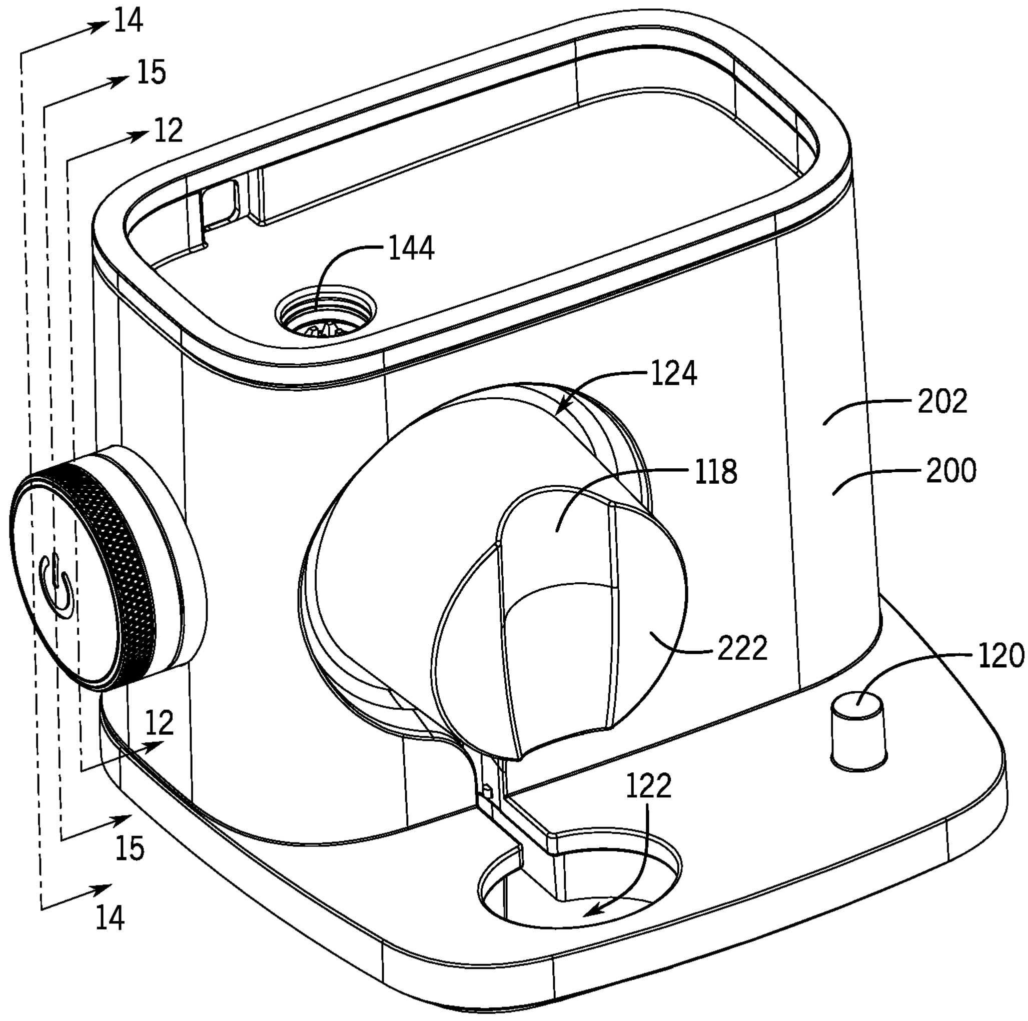
FIG. 4 is an isometric view of the base unit.
Figure 5:
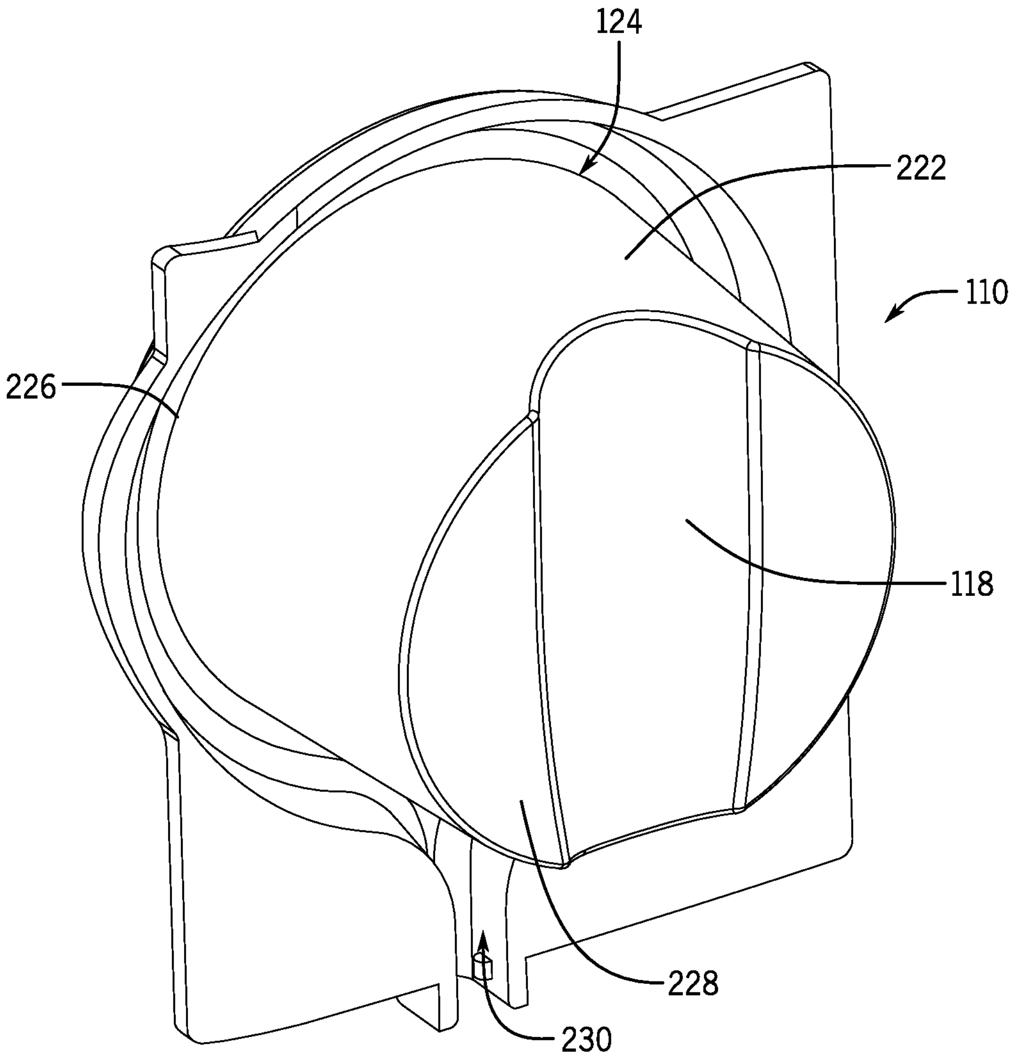
FIG. 5 is a front isometric view of a protrusion or tube nest.
Figure 6:
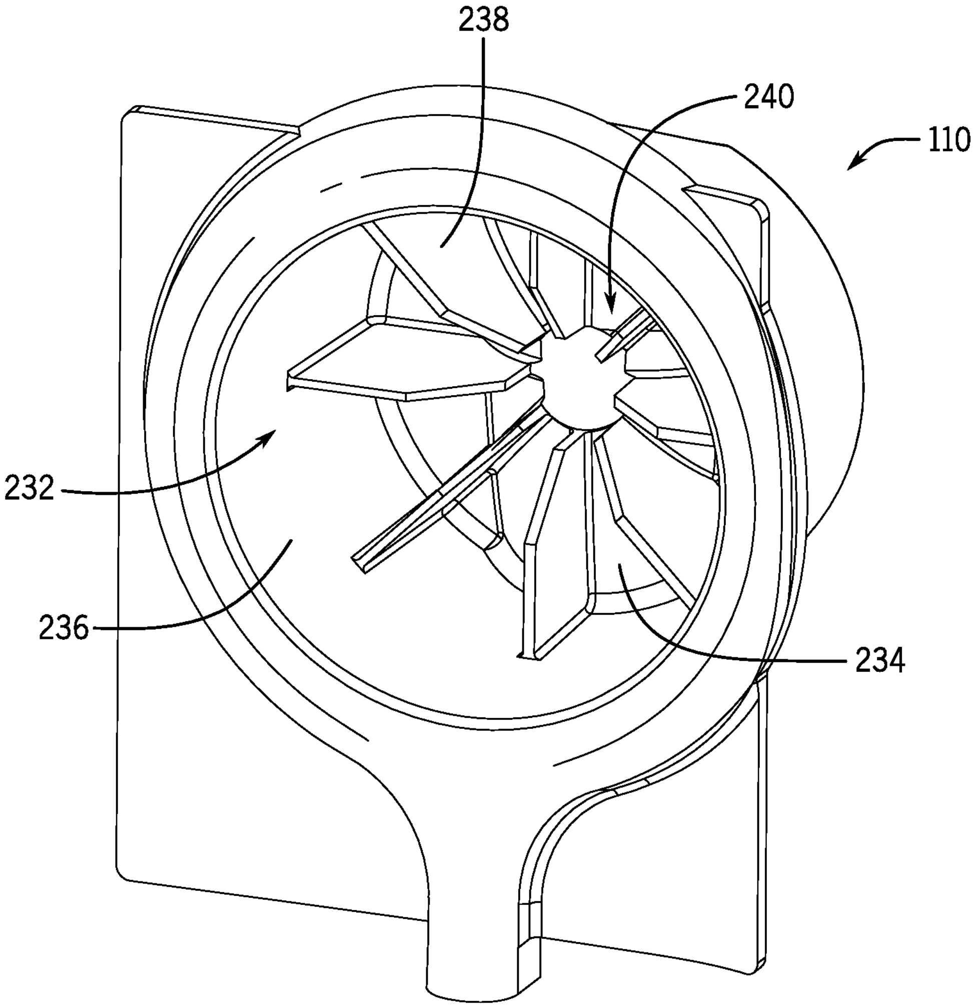
FIG. 6 is a rear isometric view of the tube nest of FIG. 5.

FIGS. 4-6 show the base 102 and various components of the oral irrigator assembly 100. FIG. 4 is an isometric view of an oral irrigator base 102. The base 102 may have an outer housing or shell 200 that houses a portion of the control assembly 112, a motor assembly 504, a pressure assembly 502, and a pump assembly 500. The base 102 may have a charging post 120 configured to provide an electric charge to the toothbrush 104 to maintain or recharge the battery power of the toothbrush 104 when it is coupled to the base 102. The charging post 120 may be formed using a portion of the outer housing 200 covering the extension 103 of the base 102 and various electrical components stored within the outer housing 200.

FIGS. 5 and 6 are front and rear isometric views of the tube nest 110. As shown, a portion of the tube nest 110 may extend away from a front face 202 of the base 102 to form a protrusion 222. The protrusion 222 may be generally cylindrically shaped with a taper from a larger diameter at its rear 226 located proximal to the front face 220 towards its front 228. In some examples, the protrusion 222 and the front face 220 may be separate components connected together or they may be molded together as a single piece. The interface between the protrusion 222 and the front face 220 may form a tube recess 124. The tube recess 124 may be formed such that it extends rearward of the front face 220 in a direction opposite that of the tube nest 110. The tube recess 124 may have a width that is larger than a diameter of the tube 108 shown in FIG. 1. This may allow for the tube 108 to be wrapped about the protrusion 222 and seat within the tube recess 124.

The tube nest 110 may also have a channel 230 formed in a lower portion thereof, the tube nest 110 extending downward from the tube recess 124. The channel 230 may have a width and depth that is larger than the diameter of the tube 108 shown in FIG. 1, as to allow the tube 108 to sit within the channel 230.

A portion of the front 228 of the protrusion 222 may be formed as the cradle 118. The cradle 118 may have a concave shape that curves away from the front 228 and towards the rear 226 of the protrusion 222. In some examples, the cradle 118 may be formed with attachment or securing devices to help position or temporarily secure the oral irrigator handle 106 so that it is adjacent the cradle 118 when stored by a user. In some examples, the cradle 118 may be formed from a magnetic material to help secure or position the oral irrigator handle 106. In some examples, the oral irrigator handle 106 has a complementary attachment, securing, or homing device to releasably position or secure the oral irrigator handle 106 at least partially within or adjacent to the cradle 118.

With reference to FIG. 6, the protrusion 222 may form a hollow interior cavity 232 defined by an interior face 234 and sidewall 236. In some examples, interior ribs 238 may extend from the interior face 234 and sidewall 236 of the protrusion 222. As shown, the ribs 238 may extend radially inward from the sidewall 236, though other suitable configurations are contemplated. In some examples, the base 102 (e.g., the protrusion 222) may include a first positioning feature. For example, a magnetic coupling device, such as a first magnet device 240 or magnetic material, may be positioned within the interior cavity 232 of the protrusion 222. For example, the first magnet device 240 may be defined or positioned on the interior face 234 and/or the ribs 238. In some examples, the first magnet device 240 may be held in place by the ribs 238 or positioned between the ribs 238. In some examples, the ribs 238 may also be formed from a magnetic material. In some cases, a stronger magnetic material may be coupled to or positioned adjacent to the interior face 234 while a weaker magnetic material may be used to form the ribs 238. This may help the cradle 118 to act as a homing device for the complementary attachment or securing device of the oral irrigator handle 106.

Figure 7:
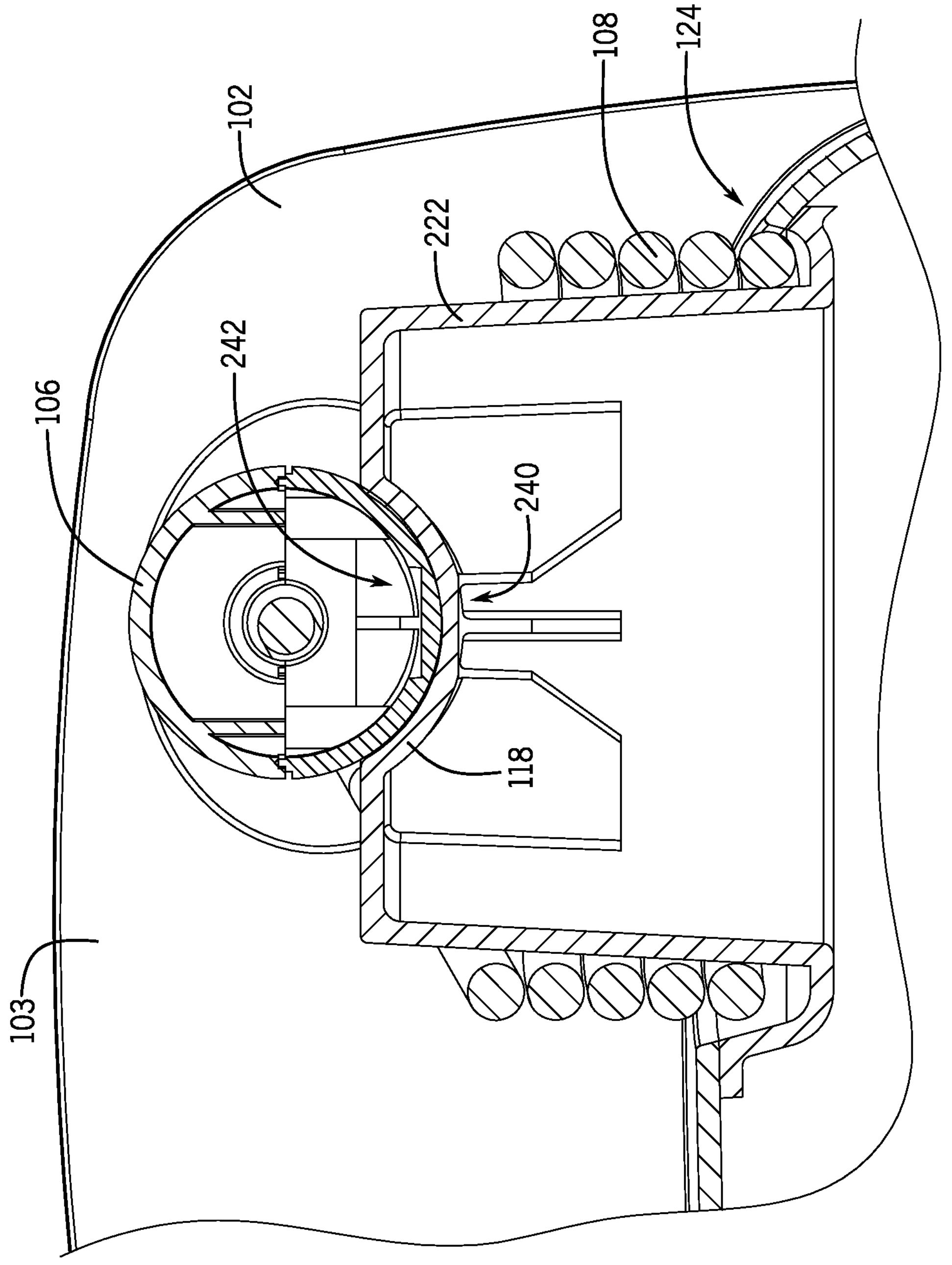
FIG. 7 is a fragmentary cross-sectional view of an oral irrigator handle coupled to the tube nest and taken along line 7-7 of FIG. 1.

FIG. 7 is a fragmentary cross-sectional view showing the oral irrigator handle 106 coupled to the protrusion 222. Referring to FIG. 7, the oral irrigator handle 106 may include a second positioning feature corresponding with the first positioning feature of the base 102 to removably couple the oral irrigator handle 106 to the base 102. As explained below, the first and second positioning features may allow the oral irrigator handle 106 to be removably coupled to the base 102 at any one of a plurality of desired positions relative to the base 102. As shown in FIG. 7, the second positioning feature may be a second magnet device 242. The second magnet device 242 may be defined or positioned on or within the oral irrigator handle 106. For example, at least a portion of the oral irrigator handle 106 may be formed from a magnetic material to magnetically couple the oral irrigator handle 106 to the cradle 118. In such examples, the second magnet device 242 of the oral irrigator handle 106 may be magnetically attracted to the first magnet device 240 of the base 102 to magnetically couple the oral irrigator handle 106 to the base 102. For instance, the magnetic attraction between the first and second magnet devices 240, 242 may magnetically couple the oral irrigator handle 106 to the cradle 118 when the oral irrigator handle 106 is positioned near the protrusion 222. In this manner, the first and second magnet devices 240, 242 may automatically align the oral irrigator handle 106 into a correct storage position. In this way, the first and second magnet devices 240, 242 may act as homing features that assist a user in positioning the oral irrigator handle 106 adjacent to the base 102.

The first and second magnet devices 240, 242 may be arranged to removably couple the oral irrigator handle 106 to the base 102 at any one of a plurality of desired positions relative to the base 102. In particular, the first and second magnet device 240, 242 may removably couple the oral irrigator handle 106 to the base 102 at any one of a plurality of vertically adjacent positions relative to the base 102. For instance, the first and second magnet devices 240, 242 may be arranged to position the oral irrigator handle 106 at a desired spacing above the extension 103 of the base 102. This may allow a user to couple the oral irrigator handle 106 to the base 102 at a desired vertical position based on user preference. For instance, the protrusion 222 may be coupled to the oral irrigator handle 106 at any position along the length of the oral irrigator handle 106 to allow user positioning of the oral irrigator handle 106 nearer or further away from the extension 103 as desired. In this manner, a user may position the oral irrigator handle 106 nearer the extension 103 to reduce a height of the oral irrigator assembly 100, which may allow the oral irrigator assembly 100 to be positioned or stored in smaller spaces compared to traditional designs, such as underneath a shelf or within a cabinet, among others.

In some examples, the magnetic composition of the interior face 234 and/or the ribs 238 may allow for the oral irrigator handle 106 to be magnetically attracted to the cradle 118 when the oral irrigator handle 106 is positioned near the cradle 118. For example, the oral irrigator handle 106 may include a complimentary or corresponding magnetic coupling device, such as a magnet or a magnetic material, that magnetically couples the oral irrigator handle 106 to the cradle 118. In some examples, the stronger pull of the interior face 234 may assist the user in properly positioning the oral irrigator handle 106 within or adjacent to the cradle 118. In some examples, the complementary attachment or securing devise of the oral irrigator handle 106 may be positioned so that the oral irrigator handle 106 may always be stored in a set position or a plurality of positions. This may allow the user easier access as the oral irrigator handle 106 is generally stored in the correct position that allows for the user to easily grasp the handle and remove it from the cradle 118.

Figure 8A:
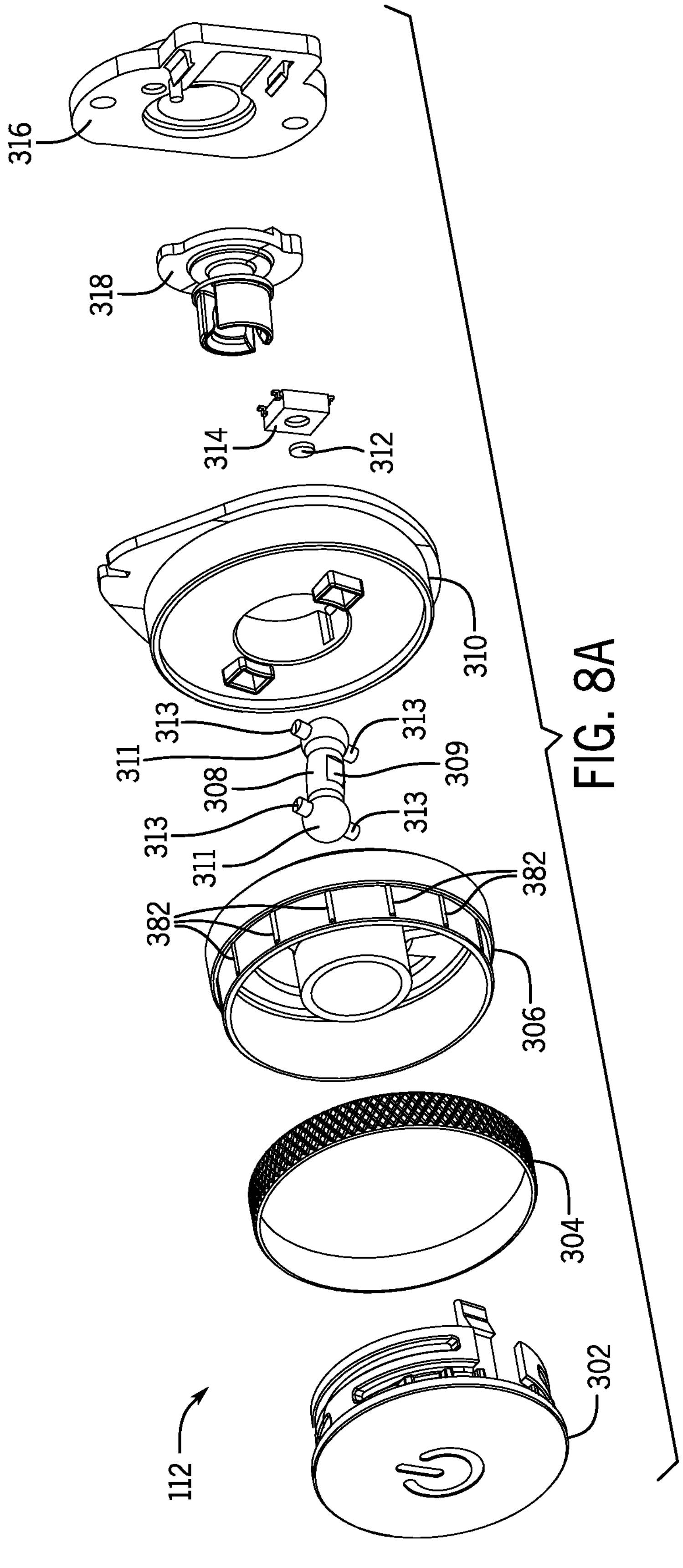
FIG. 8A is an exploded front isometric view of a control assembly.

FIGS. 8A-12 show various views of a user interface or control assembly 112 and its components. FIGS. 8A and 8B are exploded front and rear isometric views of the control assembly 112. FIGS. 8A and 8B show a push button 302, a knurled knob 304, a rotating or sliding knob 306, a coupling link 308, a bezel 310, a button 312, a switch 314, a control valve 318, and a valve face plate 316. The control valve 318 may be configured similarly to the valve structure disclosed in U.S. Patent Application Publication No. 2011/0097683, the disclosure of which is hereby incorporated herein in its entirety. The general features of the various components illustrated in FIGS. 8A and 8B will now be described.

Figure 9:
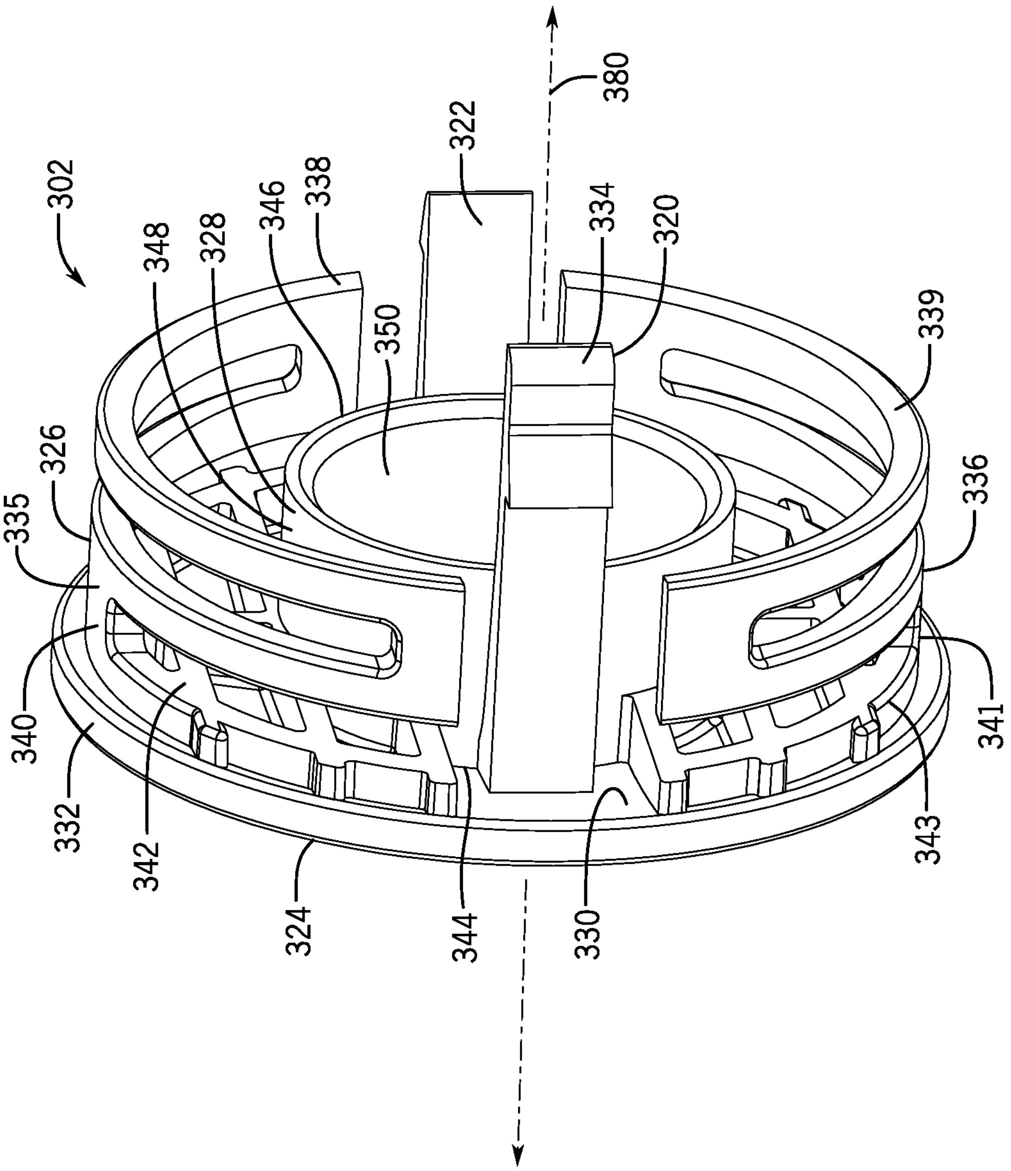
FIG. 9 is a rear isometric view of a push button of the control assembly.

FIG. 9 is a rear isometric view of the push button 302, which may be referred to as a power button. FIG. 9 shows the push button 302 with a front face 324 and a rear face 330 opposing the front face 324. The front face 324 and the rear face 330 may be generally planar. The front face 324 and the rear face 330 may be generally circular in shape and separated by a perimeter wall 332. The perimeter wall 332 may be generally normal to both the front face 324 and the rear face 330 and form an outer perimeter or circumference of the push button 302.

A first leg 320 and a second leg 322 may extend from the rear face 330 away from the front face 324 of the push button 302. The first and second legs 320, 322 may each have a tab 334 on an end thereof that is distal the rear face 330. Each tab 334 may extend away from its associated leg 320 or 322. For instance, the tabs 334 may extend in a direction perpendicular to the first and second legs 320, 322 and away from a central axis 380. For example, depending on the particular application, the tabs 334 may extend away from each other, in a direction radially away from the central axis 380, or the like. The first and second legs 320, 322 may be shaped similar to, or different from, each other. For instance, the first leg 320 may be longer than the second leg 322, or vice-versa. Each tab 334 may act as a detent to position the push button 302 within the control assembly 112.

A cylindrically shaped bias element 326 and cylindrically shaped central core 328 may also extend from the rear face 330 away from the front face 324. The central core 328 may have a diameter that is smaller than the diameter of the bias element 326. The central core 328 may be a hollow cylinder centered about the central axis 380. The central core 328 may have a first end 344 adjacent the rear face 330, and a second end 346 opposite the first end 344, and an outside surface 348 and an inside surface 350. The second end 346 may also be beveled on an inner edge.

The bias element 326 may have a diameter that is smaller than a diameter of the front face 324 and the rear face 330. The bias element 326 is cylindrically shaped with an upper arc portion 335 located above the first and second legs 320, 322 and a lower arc portion 336 located below the first and second legs 320, 322. The upper arc portion 335 may have a stabilizer 342 adjacent the rear face 330 and extending away from the front face 324. The stabilizer 342 may be formed from a plurality of ribs and protrusions extending away from the rear face 330. A connector 340 extends from the stabilizer 342 to connect the stabilizer 342 to the middle of a flexible arcuate finger 338. The connector 340 may be single protrusion or extrusion. The flexible finger 338 may be a portion of a cylinder with a resting diameter that is configured to flex radially outward to a larger diameter when the flexible finger 338 contacts a seat of the knob 306, as explained below. The flexible finger 338 may be formed with two arcuate band-shaped portions connected to each other at their respective ends. The lower arc portion 336 may be similarly shaped and function similarly to the upper arc portion 335. For example, the lower arc portion 336 may include a stabilizer 343 connected to a flexible finger 339 by a connector 341 in a manner similar to that described above. Though the bias element 326 is shown and described as a molded in biasing structure, in some examples, the bias element 326 may be a spring coupled to the push button 302. For instance, depending on the particular application, the bias element 326 may be a metal spring extending around the central core 328, such as annularly spaced from the central core 328.

Figure 10A:
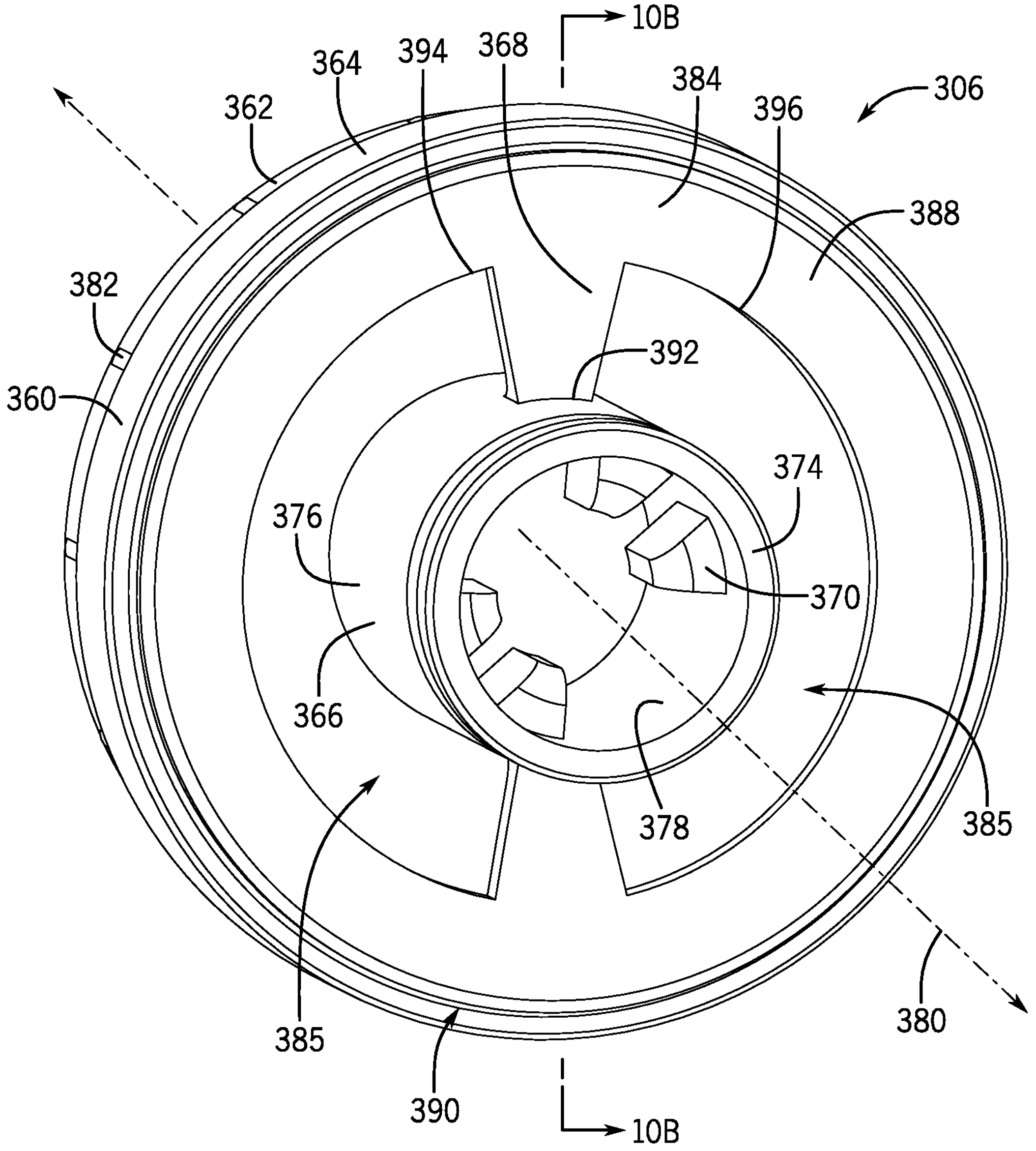
FIG. 10A is a rear isometric view of a rotating knob of the control assembly.
Figure 10B:
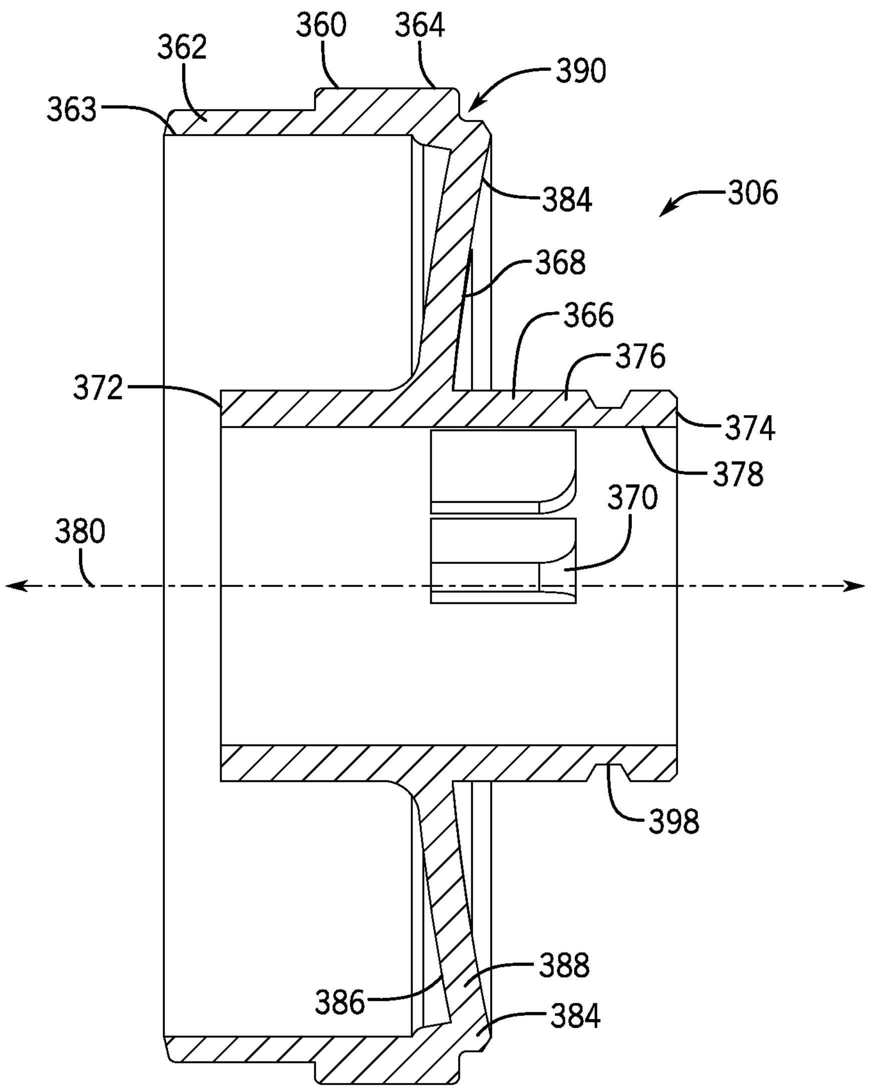
FIG. 10B is a cross-sectional view of the rotating knob taken along line 10B-10B of FIG. 10A.

FIG. 10A is a rear isometric view of the knob 306. FIG. 10B is a cross-sectional view along line 10B-10B of FIG. 10A. The knob 306 may have an outer ring 360 that is connected to a central core 366 by both a web 368 and seat 384. The outer ring 360 may be cylindrically shaped about the central axis 380, with an outside perimeter formed by a knurled knob mounting surface 362 and an abutting wall 364. The knurled knob mounting surface 362 may have a diameter smaller than the diameter of the abutting wall 364. The knurled knob mounting surface 362 may have ribs 382 extending therefrom. In one example, the ribs 382 may extend away from the central axis 380, such as radially away from the central axis 380. The outer ring 360 may have a leading edge 363 at the end of the knurled knob mounting surface 362 opposite the end adjacent to the abutting wall 364.

The outer ring 360 may be connected to the central core 366 through the web 368 and seat 384. The web 368 and the seat 384 may be somewhat orthogonal to the outer ring 360. The seat 384 may be shaped as an annular ring, with a proximal mating face 386 and a distal mating face 388 opposite the proximal mating face 386. The seat 384 may be convexly shaped, and shallowly curve away from the center of the oral irrigator assembly 100. In some examples, the proximal mating face 386 may form an angle that is less than 90 degrees with the abutting wall 364. The seat 384 may connect to the abutting wall 364 of the outer ring 360 at a step 390. An inner portion of the seat 384 may connect with the web 368.

In some examples, the web 368 may connect the seat 384 to an outer surface 376 of the central core 366. In some examples, the web 368 may be a plurality of spokes, each with an inner edge 392 adjacent to the central core 366 and an outer edge 394 adjacent to the seat 384. The spokes may taper in width from the seat 384 to the central core 366. For example, the inner edge 392 may have a length that is shorter than the length of the outer edge 394. Similar to the seat 384, the web 368 may also be convexly shaped, and shallowly curve away from the center of the oral irrigator assembly 100. In the example of FIG. 10A, two arcuate spaces 385 may be formed between the seat 384, the web 368, and the central core 366.

The central core 366 may be cylindrically shaped, with the outer surface 376 and an interior surface 378. The central core may have a front edge 372 that is proximal to the leading edge 363 of the outer ring 360, and a rear edge 374 opposite that of the front edge 372. In some examples, an annular seat 398 is formed in the outer surface 376 near the rear edge 374. The annular seat 398 may be formed as a recessed area that encompasses the circumference of the central core 366.

A plurality of alignment tabs 370 may extend inward from the interior surface 378 towards the central axis 380. In some examples, the alignment tabs 370 are spaced apart in pairs about a circumference of the interior surface 378, such that a spacing between a first tab and a second tab is equal to the spacing between a third tab and a fourth tab, but the spacing between the first and the third tabs and the second and fourth tabs is larger than between the first and second tabs. The paired tabs 370 may be used to align the coupling link 308 within the control assembly 112, as further described herein.

Figure 11A:
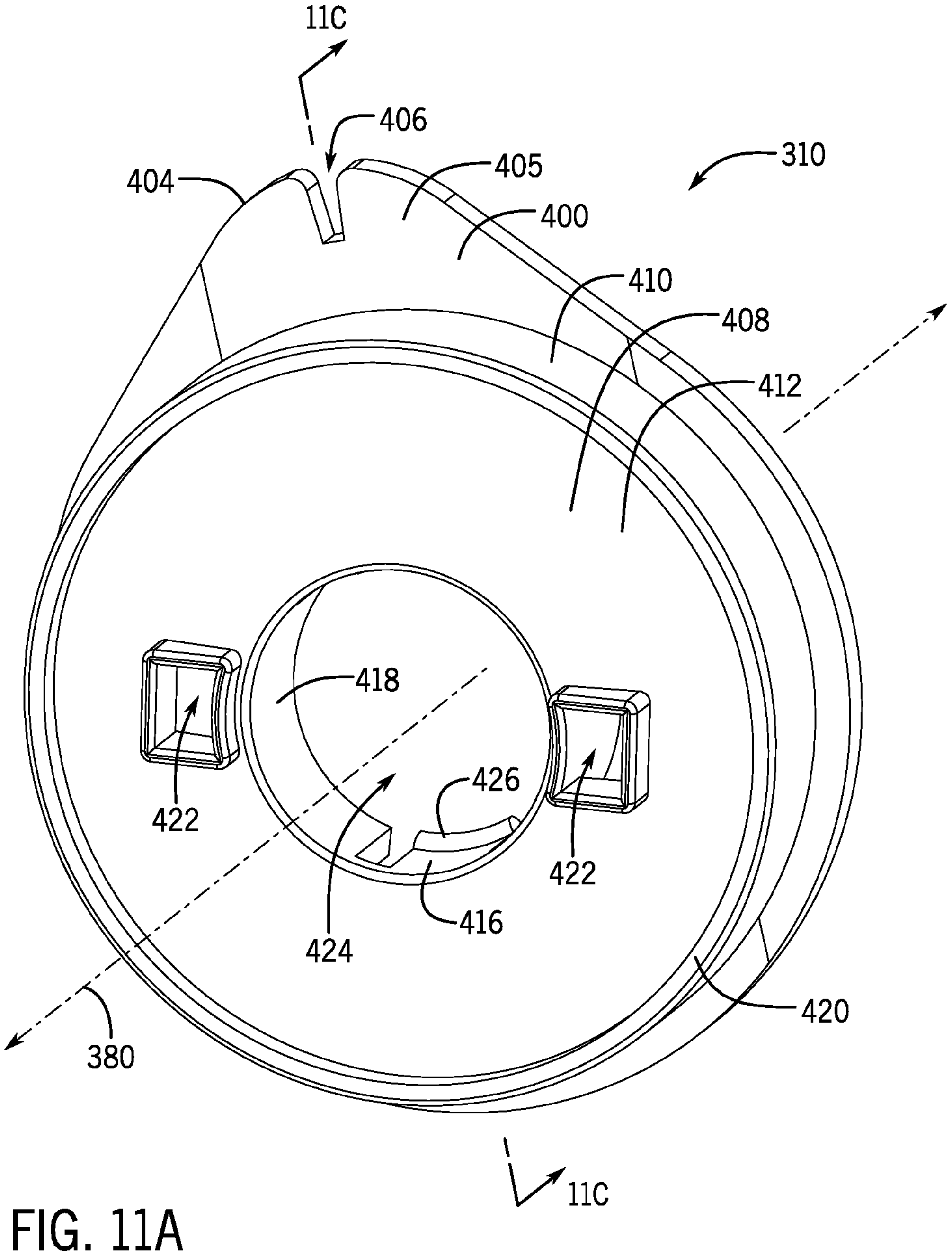
FIG. 11A is a front isometric view of a bezel of the control assembly.
Figure 11B:
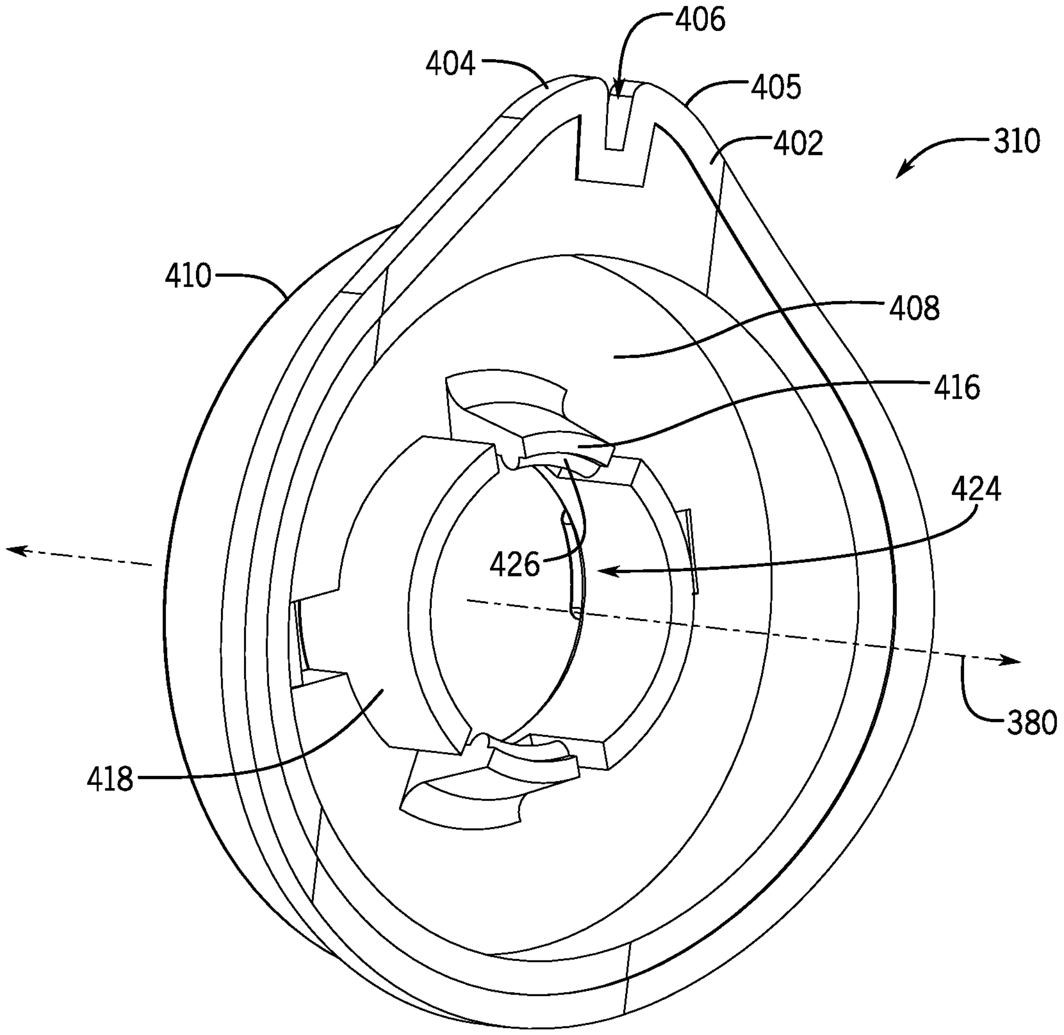
FIG. 11B is a rear isometric view of the bezel of FIG. 11A.
Figure 11C:
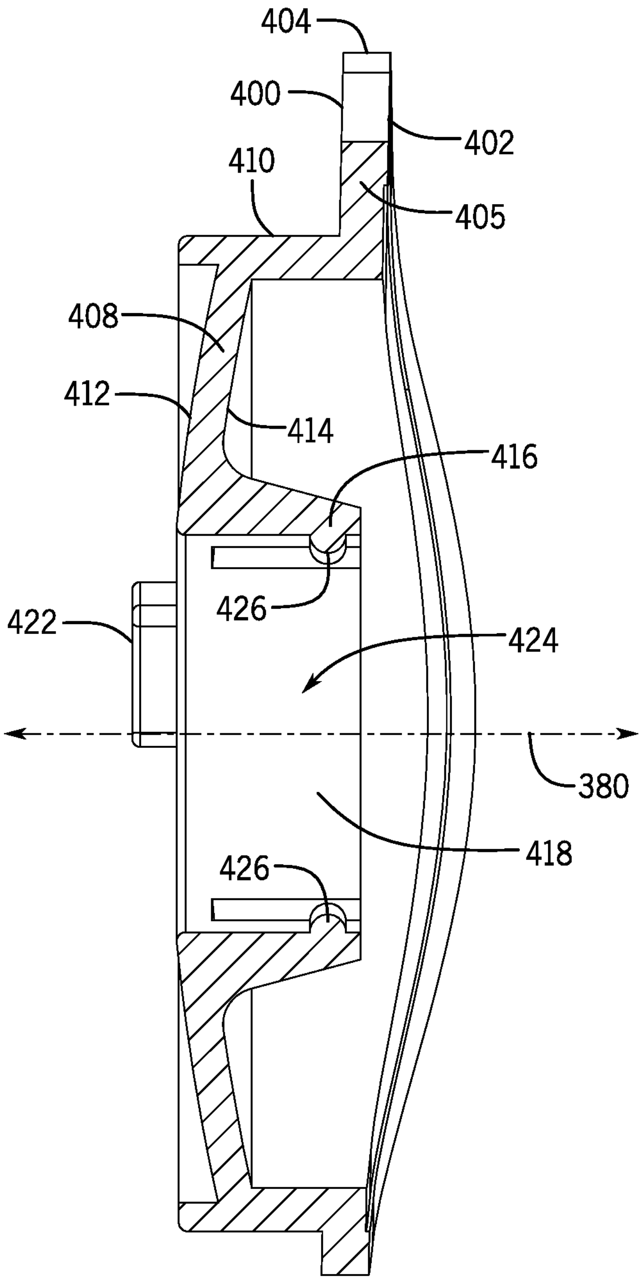
FIG. 11C is a cross-sectional view of the bezel taken along line 11C-11C of FIG. 11A.

FIGS. 11A-11C are various views of the bezel 310. FIG. 11A is a front isometric view of the bezel 310, FIG. 11B is a rear isometric view of the bezel 310, and FIG. 11C is a cross-sectional view along line 11C-11C of FIG. 11A. Referring to FIGS. 11A-11C, the shape of the bezel 310 may be formed at least partially by two concentric cylinders or walls. For example, an outer wall 410 may form a larger, outer cylinder, and two curved support walls 418 and two connecting nubs 416 may together form a smaller, inner cylinder. A knob mating wall 408 may connect the outer wall 410 to the curved support walls 418 and connecting nubs 416. A perimeter wall 404 extends as a flange about the outer wall 410.

The outer portion of the bezel 310 may be formed by the perimeter wall 404. As shown, the perimeter wall 404 may include a base mating face 400 and a rear face 402 opposite the base mating face 400. The cross-sectional view of FIG. 11C shows that the perimeter wall 404 may have a generally concave shape that curves away from the center of the oral irrigator assembly 100. The curved shape of the perimeter wall 404 may mimic the shape of an internal wall of the base 102 adjacent to which the bezel 310 may be positioned.

The outer perimeter of the perimeter wall 404 may be generally annularly shaped except near a top portion that increases in diameter to form a tab 405 with an alignment slot 406. The alignment slot 406 may be formed in the upper portion of the perimeter wall 404, proximal to the reservoir 114 of the oral irrigator assembly 100. The alignment slot 406 may be used to align the rotational position of the bezel 310 with respect to the base 102.

The outer wall 410 may extend orthogonally from the base mating face 400 of the perimeter wall 404 and away from the rear face 402. The outer wall 410 may connect the knob mating wall 408 to the perimeter wall 404. At the intersection of the outer wall 410 and the knob mating wall 408, a lip 420 may be formed.

The knob mating wall 408 may be generally orthogonal to the outer wall 410. The knob mating wall 408 may have a proximal face 412 and a distal face 414. The knob mating wall 408 may be annularly shaped, with an outer perimeter formed at the outer wall 410 and an inner perimeter formed by the curved support walls 418 and the connecting nubs 416. The knob mating wall 408 may be curved with an angle that mirrors the angle of the web 368 and seat 384 of the knob 306.

A plurality of leg receiving ports 422 may be formed within the knob mating wall 408 and include an aperture that extends between the proximal face 412 and the distal face 414. The leg receiving ports 422 may also extend orthogonally from the proximal face 412 and away from the distal face 414. In some examples, the leg receiving ports 422 may have a cross-sectional shape that is generally rectangular, similar to the shape shown in FIG. 11A. In other examples, the cross-sectional shape may be round, triangular, oblong or other similar shapes.

In some examples, the leg receiving ports 422 may have an inner edge proximal to a central bore 424 formed by the curved support walls 418 and connecting nubs 416. The inner edge of the leg receiving ports 422 may curve outward from the central bore 424, similar to the shape of the curved support walls 418. In some examples, the leg receiving ports 422 are spaced equally about the central bore 424.

The central bore 424 may be formed through the proximal face 412 and the distal face 414 of the knob mating wall 408. The curved support walls 418 and connecting nubs 416 may extend orthogonally from the distal face 414 and away from the proximal face 412. The curved support walls 418 may have a generally constant thickness and may be curved about the central axis 380. The connecting nubs 416 may taper in thickness from a larger width adjacent the distal face 414 to a smaller width with distance away from the distal face 414. At opposite distal edge of the connecting nubs 416, a detent 426 may be formed. The detent 426 may be a raised feature that extends inwardly from the connecting nub 416 and towards the central axis 380.

Figure 8B:
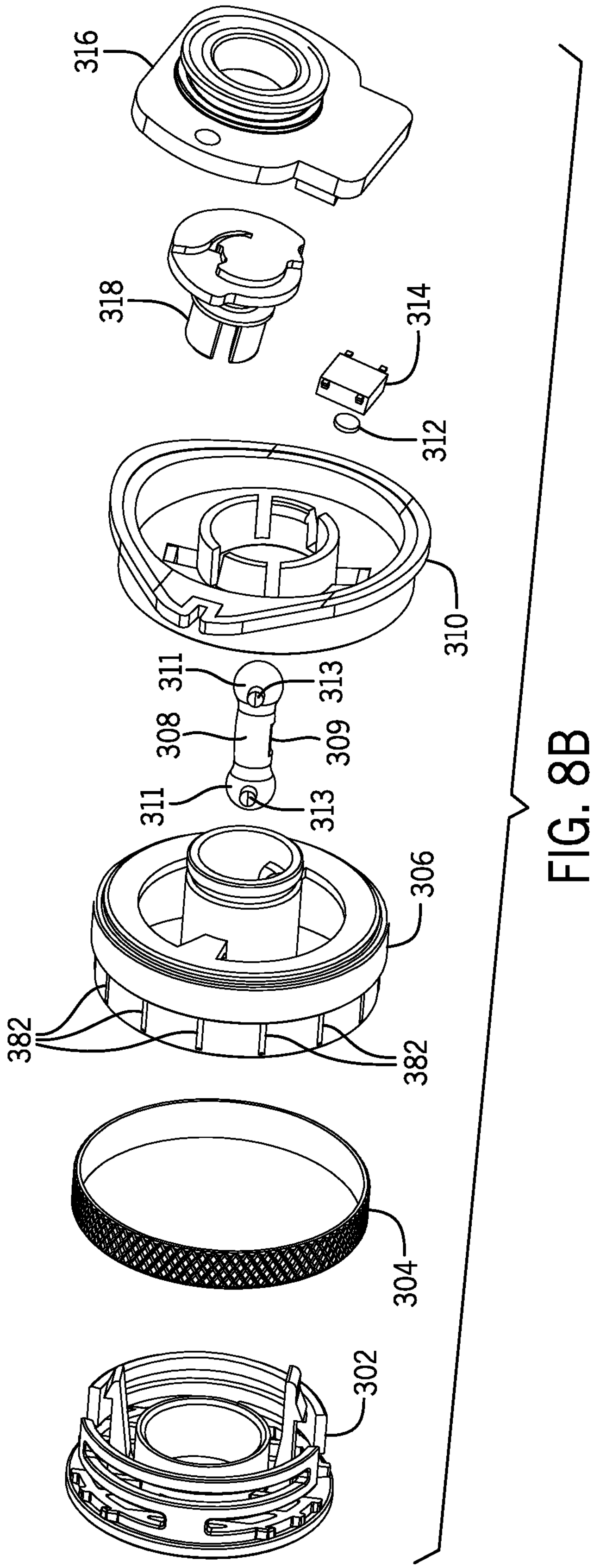
FIG. 8B is an exploded rear isometric view of the control assembly of FIG. 8A.

With reference to FIGS. 8A and 8B, the coupling link 308 may have a cylindrical center portion 309 positioned between two bulbous ends 311. In some examples, the bulbous ends 311 may be spherically shaped. Each bulbous end 311 may have two fingers 313 that protrude from opposite sides. The fingers 313 may be cylindrically shaped to couple with the control valve 318 and the knob 306.

Figure 13:
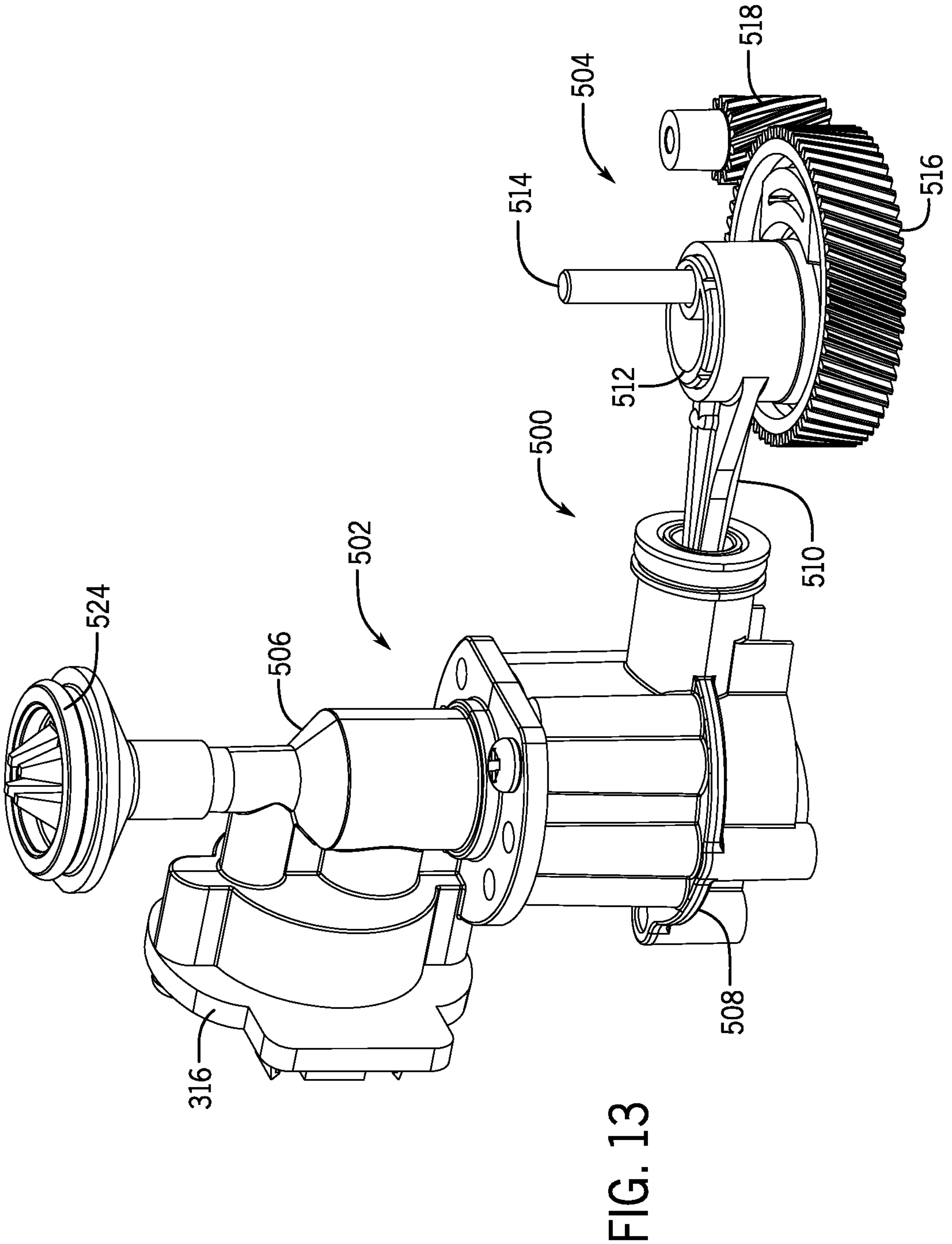
FIG. 13 is an isometric view of a pump assembly and a pressure assembly and a partial view of a motor assembly.
Figure 14:
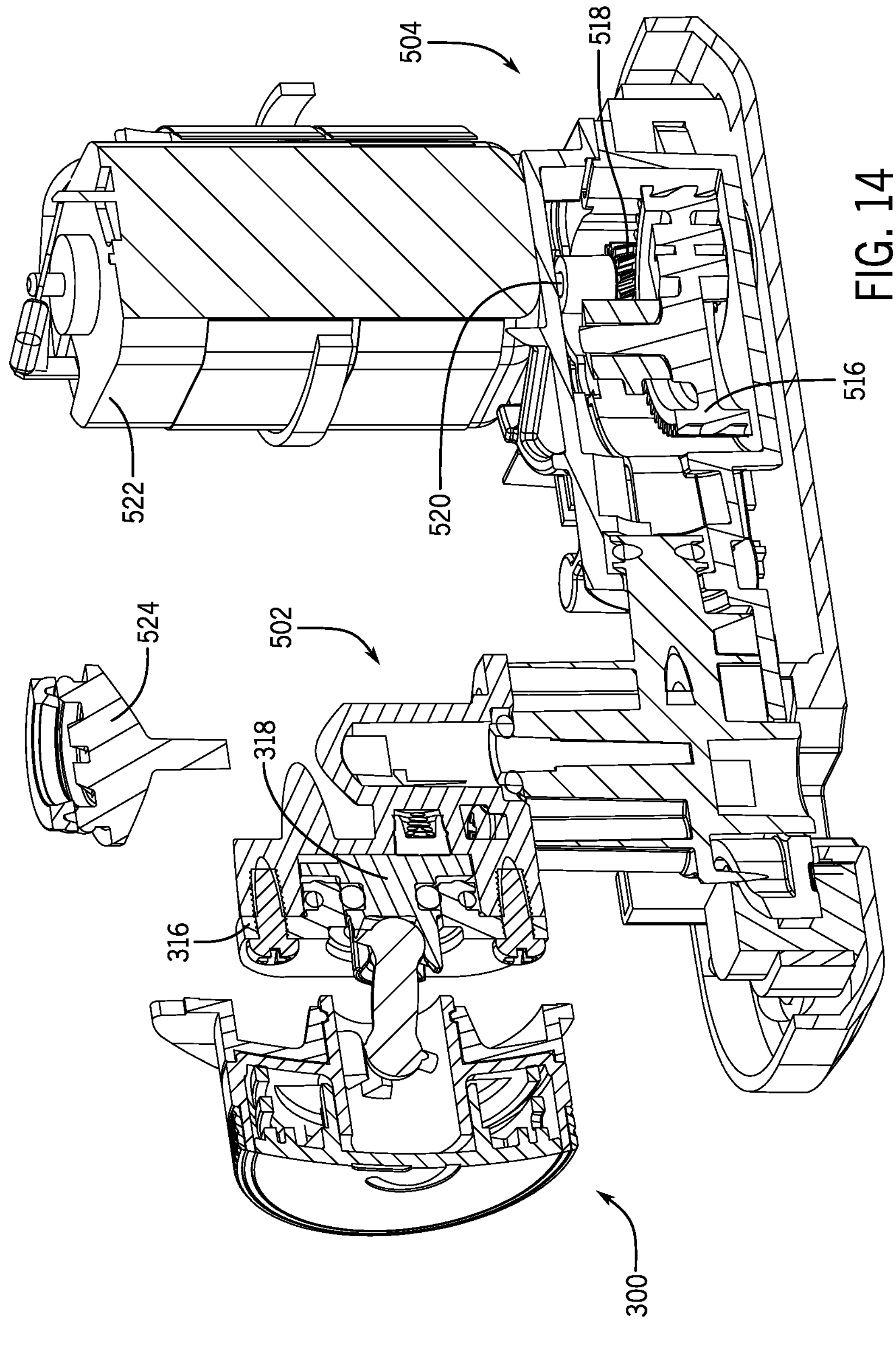
FIG. 14 is a fragmentary, cross-sectional view of the control assembly, the pressure assembly, and the motor assembly taken along line 14-14 of FIG. 4.
Figure 15:
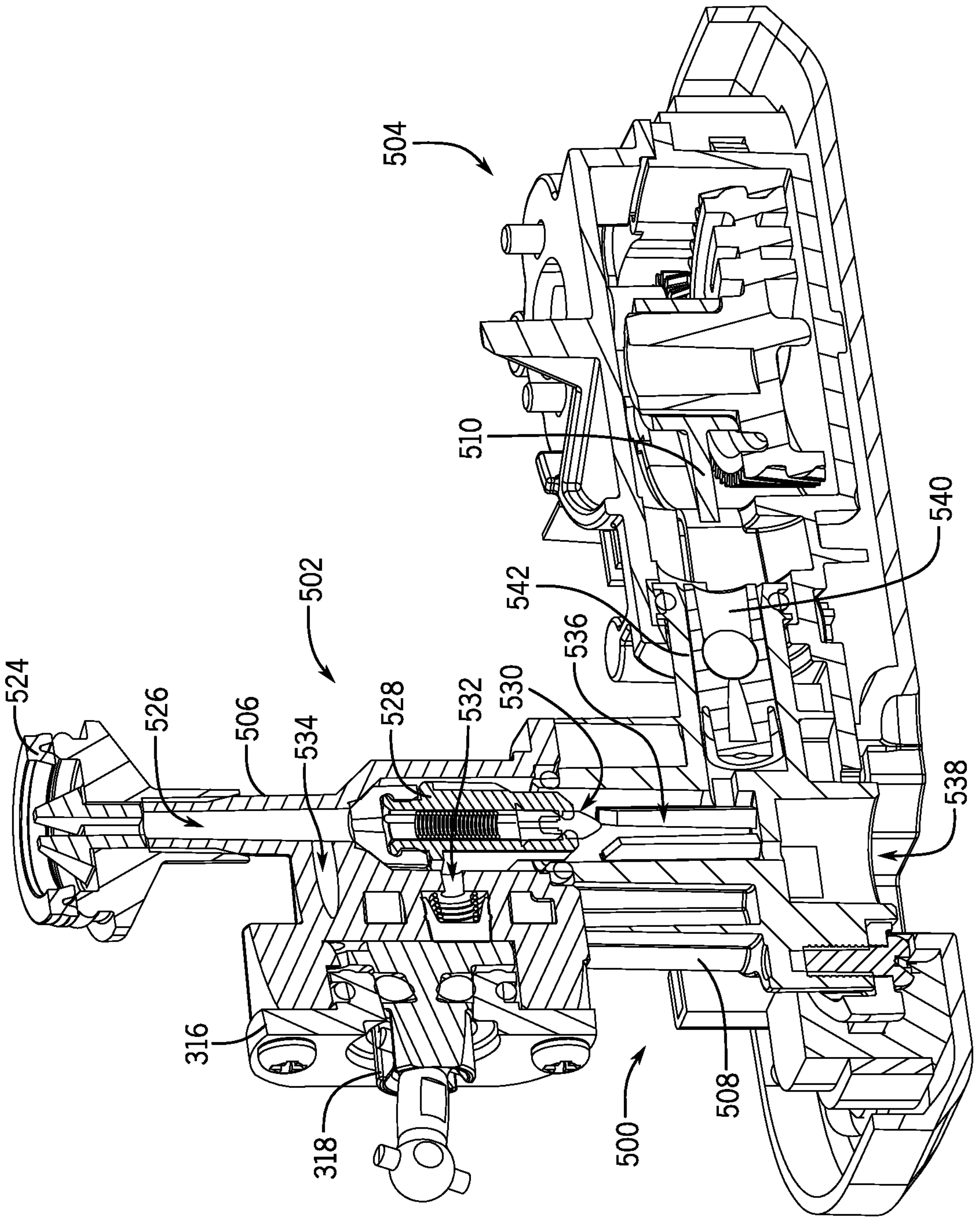
FIG. 15 is a fragmentary, cross-sectional view of the control assembly, the pressure assembly, and the pump assembly taken along line 15-15 of FIG. 4.

FIGS. 13-15 show various views of the control assembly 112, a pressure assembly 502, a pump assembly 500, and a motor assembly 504. FIG. 13 is an isometric view of the pump assembly 500, the pressure assembly 502 and a partial view of the motor assembly 504. FIG. 14 is a cross-sectional isometric view of the control assembly 112, the pressure assembly 502, and the motor assembly 504 along line 14-14 of FIG. 4. FIG. 15 is a cross-sectional isometric view of the control assembly 112, pressure assembly 502, the pump assembly 500, and the motor assembly 504 along line 15-15 of FIG. 4.

The various components of the pressure assembly 502 will now be described. As shown in FIG. 15, the pressure assembly 502 may be fluidly connected to the reservoir valve actuator 524. The reservoir valve actuator 524 may be configured to allow fluid stored within the reservoir 114 to flow through a channel in the reservoir valve actuator 524 and into a pressure assembly housing 506 of the pressure assembly 502. The top portion of the reservoir valve actuator 524 may have engagement points that contact the valve assembly 144, and help compress a spring in the valve assembly 144. The compression of the spring with the valve assembly 144 allows the valve assembly 144 to disengage from the sealable port 139. Once the valve assembly 144 is disengaged from the sealable port 139, fluid may flow from the reservoir 114, around the valve assembly 144, through the sealable port 139, through the reservoir valve actuator 524, and into the pressure assembly 502

The pressure assembly 502 is located downstream of the reservoir valve actuator 524, and may have a pressure valve inlet 526 located upstream of a pressure valve 528, and a pressure valve outlet 530 located downstream of the pressure valve 528. The pressure valve 528 is configured with a spring that allows the pressure valve 528 to move up and down (towards and away from the reservoir 114) within the pressure assembly housing 506 when a vacuum is applied to the pressure valve 528.

The pressure assembly housing 506 may be fluidly connected to the control valve 318. The pressure assembly housing 506 may have a diverter inlet 532 located downstream of the pressure valve 528 and a diverter outlet located upstream of the pressure valve 528 but downstream of the pressure valve inlet 526. A portion of the control valve 318 may be rotatably positioned within the pressure assembly housing 506 and positioned adjacent the valve face plate 316. The rotatable position of the control valve 318 with respect to the valve face plate 316 allows a fluid pathway to be selectively formed between the diverter inlet 532 and the diverter outlet 534. The pressure assembly 502 may be fluidly connected to the pump assembly 500.

As shown in FIGS. 13 and 15, the pump assembly 500 may have a pump housing 508 that encapsulates a pump inlet 536, a cylinder 542, a portion of a connecting rod 510, a piston 540, and a pump outlet 538. In some examples, the pump inlet 536 is adjacent and fluidly connected to the pressure valve outlet 530. The cylinder 542 may enclose a piston 540. The piston 540 may be connected to a first end of a connecting rod 510. In some examples, the piston 540 is cylindrically shaped and similar to a cylindrical shape of the cylinder 542. The attachment of the piston 540 to the connecting rod 510 may allow the piston to be moved laterally within the cylinder 542, and be pushed towards the control assembly 112 and away from the control assembly 112, based on the position of the first end of the connecting rod 510. The cylinder 542 fluidly connects the pump inlet 536 with the pump outlet 538. There may be a clearance fit between the piston 540 and the cylinder 542 that is a relatively small distance, such that fluid present within the pump assembly 500 may not flow past the piston 540 within the cylinder 542. The pump assembly 500 may be coupled to the motor assembly 504.

The motor assembly 504 is shown in FIGS. 13-15. As shown in FIG. 14, the motor assembly 504 may have a motor 522 with a drive shaft 520 extending from a bottom portion of the motor 522. The drive shaft 520 may be positioned within and coupled to a driver gear 518. The driver gear 518 may have a plurality of teeth with a pitch length and an angled, beveled, or helical shape. The driver gear 518 may be coupled to a driven gear 516. The driven gear 516 may have a plurality of teeth with the same pitch length and tooth shape as the driver gear 518. In some examples, a diameter of the driver gear 518 may be smaller than that of the driven gear 516. In some other examples, a belt drive couples the driver gear 518 and driven gear 516.

As shown in FIG. 13, the driven gear 516 may have a central section that extends upwards towards the reservoir 114. The central section may be formed with an eccentric lobe 512. The eccentric lobe 512 may be a cylinder that extends away from the driven gear 516, with a central axis that is offset from the driven shaft 514. An interior portion of the eccentric lobe 512 may be formed to couple with a driven shaft 514. An exterior portion of the eccentric lobe 512 may be configured to couple with a second end of the connecting rod 510.

With continued reference to FIGS. 13-15, the overall assembly of the oral irrigator assembly 100 will now be described. As shown in FIGS. 13-15, the motor 522 may be positioned so that the drive shaft 520 is inserted within or coupled to the motor 522. An opposing end of the drive shaft 520 may be coupled to the driver gear 518. The driven gear 516 may be positioned adjacent the driver gear 518 so that the teeth of the driver gear 518 mesh with the teeth of the driven gear 516. The second end of the connecting rod 510 may be positioned about the eccentric lobe 512 extending from the driven gear 516. The first end of the connecting rod 510 may be coupled to the piston 540, and the piston 540 positioned may be within the cylinder 542 of the pump assembly 500.

As shown in FIG. 15, the pressure valve 528 may be positioned within the pressure assembly housing 506 of the pressure assembly 502. The pressure assembly 502 may be coupled to the pump assembly 500 so that the pressure valve outlet 530 is fluidly coupled with the pump inlet 536.

The control valve 318 may be positioned adjacent to and between the diverter inlet 532 and the diverter outlet 534 of the pressure assembly housing 506. The valve face plate 316 may be positioned adjacent to the pressure assembly housing 506 that surrounds a portion of the control valve 318. The coupling link 308 may be positioned within an extending cylinder portion of the control valve 318.

Figure 12:
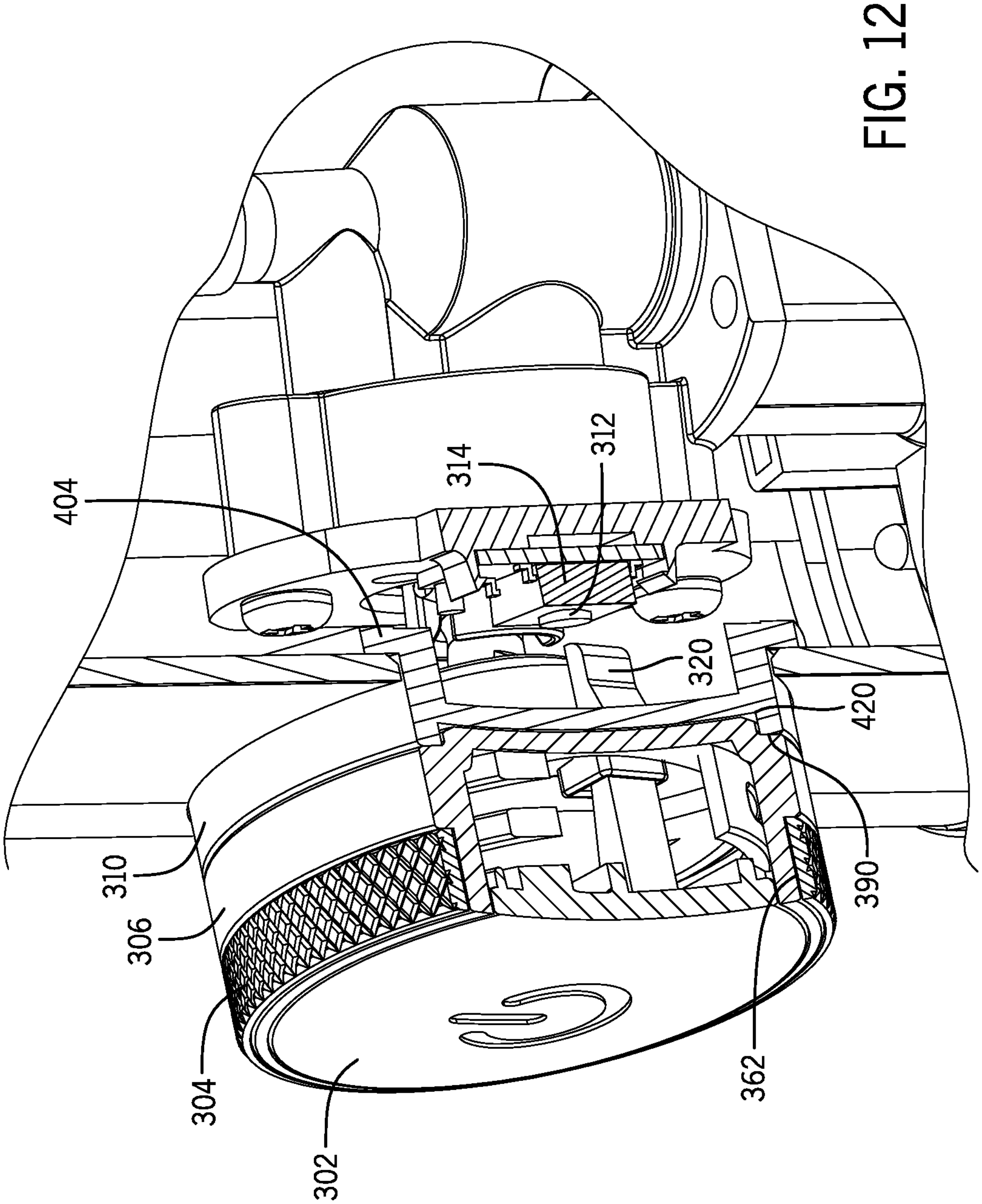
FIG. 12 is a fragmentary, cross-sectional view of the base unit taken along line 12-12 of FIG. 4.

As shown in FIGS. 12 and 14, the push button 302 may be coupled with the knob 306 and the bezel 310. The base mating face 400 of the bezel 310 may be positioned adjacent to an interior surface of the base 102. The alignment slot 406 may be aligned with a post formed on the interior surface of the base 102. The proximal face 412 of the knob mating wall 408 of the bezel 310 may be positioned adjacent to the distal mating face 388 of the knob 306. The detents 426 of the connecting nubs 416 of the bezel 310 may align with the annular seat 398 of the knob 306, helping fix a lateral position of the bezel 310 and knob 306 with respect to each other, but still allowing the knob 306 to rotate about the bezel 310. The lip 420 of the bezel 310 may be positioned adjacent to the step 390 of the knob 306.

The push button 302 may then be assembled to the knob 306 and the bezel 310. The push button 302 may be aligned so that the first leg 320 is positioned to a front of the oral irrigator assembly 100 and the second leg 322 is positioned to a rear of the oral irrigator assembly 100. The first leg 320 and second leg 322 may be inserted into the respective one of the arcuate openings of the spaces 385 created between the web 368, the seat 384, and the central core 366 of the knob 306 and then through the leg receiving ports 422 of the bezel 310. The tabs 334 present on the end of each leg 320, 322 may help prevent the push button 302 from being separated from the knob 306 and bezel 310, as the tabs 334 may engage with the distal face 414 of the knob mating wall 408 of the bezel 310.

The knurled knob 304 may be coupled to the knob 306 about the knurled knob mounting surface 362. The knurled knob 304 may be adjustably fixed to the knob 306 by a press fit formed by the interaction of the ribs 382 extending away from the knurled knob mounting surface 362 and contacting the inside surface of the knurled knob 304.

The coupling link 308 may be positioned between the knob 306 and the control valve 318. The fingers 313 on one of the bulbous ends 311 align with the tabs 370 of the knob 306. The fingers 313 on the opposite bulbous end 311 may then align with two notches in the control valve 318. The alignment of the legs with the knob 306 and the control valve 318 effectively couples the knob 306 with the control valve 318. When a user rotates the knob 306, the control valve 318 is also rotated in the same direction and the same rotational distance.

The position of the push button 302 within the bezel 310 may align the first leg 320 of the push button 302 with the button 312. The button 312 may be physically coupled with the switch 314, and the switch 314 is then physically coupled to the valve face plate 316. The switch 314 may then be electrically coupled to the motor 522. The motor assembly 504, the pump assembly 500 and the pressure assembly 502 may then be positioned within the base 102, with the control assembly 112 being positioned mounted on an exterior of the base 102.

The tube 108 may be connected to the oral irrigator handle 106. The tube 108 may then be wrapped around the tube nest 110 when the oral irrigator handle 106 is in a stored position. In some examples, the tube recess 124 formed by the tube nest 110 and the base 102 may allow for a portion of the tube 108 wrapped around the tube nest 110 to be contained within the tube recess 124. Additionally or alternatively, the tube routing aperture 122 may allow for a portion of the tube 108 adjacent the oral irrigator handle 106 to hang below the oral irrigator handle 106 and not contact the base 102. For example, when the oral irrigator handle 106 is coupled to the base 102 at the tube nest 110, a portion of the tube 108 adjacent to the oral irrigator handle 106 may be received within the tube routing aperture 122 to allow proper alignment of the oral irrigator handle 106 within the cradle 118 without structural interference between the tube 108 and the base 102.

Operation of the oral irrigator assembly 100 will now be described. To begin, the user may remove the reservoir 114 from the assembly 100, and open the adjustable lid 116 to fill the reservoir 114 with fluid. The user may then close the adjustable lid 116 and couple the reservoir 114 to the oral irrigator assembly 100. The reservoir valve actuator 524 may engage the valve assembly 144 of the reservoir 114 to allow fluid stored within the reservoir 114 to flow into and through the pressure assembly 502, into and through the pump assembly 500, and through the tube 108 into the oral irrigator handle 106.

A user may engage the control assembly 112 to turn the oral irrigator assembly 100 off and on, and to also adjust the pressure and/or volume of fluid that may be supplied to the oral irrigator handle 106 and eventually released from the oral irrigator handle 106 through the jet tip 107. To turn the oral irrigator assembly 100 on and off, a user may contact the front face 324 of the push button 302 to force or depress the push button 302 towards the base 102 of the oral irrigator assembly 100. The push button 302 may be moved with respect to the control assembly 112 when the user exerts a force on the push button 302 that is greater than the bias force provided by the bias element 326.

The flexible fingers 338, 339 may be configured to flex to a larger diameter when the fingers 338, 339 contact the seat 384 of the knob 306. For instance, the sloped shape of the seat 384 may force the fingers 338, 339 apart to allow the push button 302 to be moved horizontally axially inward with respect to the knob 306.

The movement of the push button 302 may then allow the first leg 320 to contact the button 312, which may then activate the switch 314 to selectively turn on or off the oral irrigator assembly 100. The biased design of the push button 302 allows it to return to its resting position with respect to the control assembly 112 when the user releases contact on the push button 302. When the push button 302 is engaged, an electrical connection is made through the switch 314, which connects an electrical circuit to activate the motor 522. The motor 522 begins to rotate, which rotates the drive shaft 520. The rotation of the drive shaft 520 rotates the driver gear 518, which in turn rotates the driven gear 516. The ratio of the diameters of the driver gear 518 and the driven gear 516 determines the rotational speed change from the driver gear 518 to the driven gear 516. The rotation of the driven gear 516 causes the eccentric lobe 512 to eccentrically rotate about the driven shaft 514, which moves the connecting rod 510 eccentrically laterally back and forth, towards and away from the control assembly 112.

The lateral movement of the connecting rod 510 moves the piston 540 in the same lateral movement back and forth within the cylinder 542. This piston 540 movement causes an alternating vacuum or negative pressure and a positive pressure. The negative pressure is enough to move the pressure valve 528 within the pressure assembly housing 506 downward to allow fluid to flow through the pressure valve 528 and the pressure valve outlet 530. The positive pressure moves the pressure valve 528 to position the pressure valve 528 so that fluid may not flow in through the pressure valve 528 and through the pressure valve outlet 530. The piston 540 movement allows for a pulsed flow to be supplied through the tube 108 and into the oral irrigator handle 106.

The rotation of the knob 306 may control the pressure and/or volumetric flow of a fluid out of the oral irrigator handle 106. In some examples, the leg receiving ports 422 of the bezel 310 may provide a limit as to the rotation in one direction or an opposite direction of the knob 306 about the bezel 310. A user may rotate the knurled knob 304 to rotate the knob 306 about the bezel 310. The knob 306 may be rotated in a clockwise direction until the web 368 of the knob 306 contacts the leg receiving port 422 of the bezel 310 that is surrounding the first leg 320. Similarly, the knob 306 may be rotated in a counter clockwise direction until the web 368 contacts the leg receiving port 422 surrounding the second leg 322.

When the knob 306 is rotated in a first direction, the rotation of the knob 306 causes the rotation of the coupling link 308, which causes the rotation of the control valve 318. The rotation of the control valve 318 may cause a fluid pathway to be formed between the control valve 318 and the valve face plate 316 to fluidly connect the diverter inlet 532 with the diverter outlet 534. The creation of this fluid pathway may allow for a volume of fluid flowing from the reservoir 114 and through the pressure assembly 502 to be siphoned away from the pressure valve outlet 530, through the control valve 318, and back through the pressure valve 528. The size of the fluid pathway may be dependent on the position of the control valve 318 adjacent the valve face plate 316. A large fluid pathway may result in a decreased volume and pressure of the fluid that exits the pressure valve outlet 530 and is eventually transmitted through the oral irrigator handle 106. A small fluid pathway may divert a smaller volume of water away from the pressure valve outlet 530, such that the volume and pressure of the fluid that exits the pressure valve outlet 530 is not substantially decreased.

With reference to FIGS. 1, 2, and 16, the shape of the cradle 118 may help position or temporarily couple the oral irrigator handle 106 within or adjacent to the cradle 118. In some examples, there is not a set position for the oral irrigator handle 106 to couple with the cradle 118. As noted above, the protrusion 222 from which the cradle 118 is formed may have magnetic material to align with magnetic material or feature within the oral irrigator handle 106. In some examples, the location of the magnetic material helps position the oral irrigator handle 106 in a first position. In other examples, there may be a plurality of positions in which the magnetic material of the protrusion 222 may align with a magnetic feature in the oral irrigator handle 106. In such examples, the vertical position of the oral irrigator handle 106 with respect to the cradle 118 may be adjusted based upon user preference. For instance, the user may position the oral irrigator handle 106 at a desired spacing of the oral irrigator handle 106 above the extension 103 based upon user preference.

In some examples, the oral irrigator handle 106 may be adjusted to a vertical positon that positions the portion of the tube 108 adjacent the oral irrigator handle 106 within the tube routing aperture 122. The temporary location of the portion of the tube 108 adjacent the oral irrigator handle 106 may allow for the oral irrigator handle 106 to be moved to a vertical position that is lower with respect to the base 102 than with a base without a tube routing aperture 122. This ability to adjust the vertical location of the oral irrigator handle 106 with respect to the base 102 may also allow for a user to more easily access the reservoir 114 to remove the reservoir 114 from the base 102 to refill it with a fluid in preparation for use.

In some examples, the shape of the reservoir 114 may better help a user to grasp the reservoir 114 with one hand. For example, the reservoir 114 may have a narrow width that may be more amenable to a user grasping with one hand, as opposed to a bulky reservoir which would require a user to use both hands to grasp the reservoir. A user may grasp the reservoir 114 with one hand when removing the reservoir 114 for refilling or when assembling the reservoir 114 back with the oral irrigator assembly 100 in preparation for use or storage. To grasp the reservoir, the user may place his or her fingers on the planar face 140 or 142 and his or her thumb on the opposite planar face 140 or 142 and apply inward pressure.

In some examples, the location of the tube recess 124 may allow for a user to more easily store a portion of the tube 108 when the oral irrigator assembly 100 is not in use. For instance, the flexible tube 108 may be easily wrapped around the tube nest 110 and be partially stored within the tube recess 124.

A design for an oral irrigator assembly 100, 1600 has been described herein. It should be noted that any of the features in the various examples and embodiments provided herein may be interchangeable and/or replaceable with any other example or embodiment. As such, the discussion of any component or element with respect to a particular example or embodiment is meant as illustrative only.

It should be noted that although the various examples discussed herein have been discussed with respect to oral irrigators, the devices and techniques may be applied in a variety of applications, such as, but not limited to, toothbrushes, washing devices, showerheads, sink apparatus, and the like.

All directional references (e.g., upper, lower, upward, downward, left, right, leftward, rightward, top, bottom, above, below, vertical, horizontal, clockwise, and counterclockwise) are only used for identification purposes to aid the reader's understanding of the examples of the disclosure, and do not create limitations, particularly as to the position, orientation, or use of the disclosure unless specifically set forth in the claims. Joinder references (e.g., attached, coupled, connected, joined and the like) are to be construed broadly and may include intermediate members between the connection of elements and relative movement between elements. As such, joinder references do not necessarily infer that two elements are directly connected and in fixed relation to each other.

In some instances, components are described by reference to "ends" having a particular characteristic and/or being connected with another part. However, those skilled in the art will recognize that the embodiments are not limited to components which terminate immediately beyond their point of connection with other parts. Thus the term "end" should be broadly interpreted, in a manner that includes areas adjacent rearward, forward of or otherwise near the terminus of a particular element, link, component, part, member or the like.

In methodologies directly or indirectly set forth herein, various steps and operations are described in one possible order of operation but those skilled in the art will recognize the steps and operation may be rearranged, replaced or eliminated without necessarily departing from the spirit and scope of the present disclosure. It is intended that all matter contained in the above description or shown in the accompanying drawings shall be interpreted as illustrative only and not limiting. Changes in detail or structure may be made without departing from the broad understanding of the embodiments as defined in the appended claims.

The invention claimed is:

1. An oral irrigator assembly comprising:

a base including a pressure assembly;

a fluid reservoir removably coupled to the base;

an oral irrigator handle fluidly coupled to the fluid reservoir and the pressure assembly, the oral irrigator handle adjustably coupled to the base via a magnetic attachment;

a control assembly including a push button circumferentially surrounded by a knob, wherein a surface of the knob, engageable by a user, is substantially perpendicular to a face of the push button, engageable by the user, wherein the push button is arranged to engage a power button to electrically turn the oral irrigator assembly on and off, and wherein the knob is mechanically coupled to the pressure assembly to mechanically adjust at least one of a pressure and a volume of a fluid expelled through the oral irrigator handle upon movement of the knob;

the control assembly further including a bezel coupled to the base;

wherein a leg of the push button projecting toward the base is received through a receiving port of the bezel, the leg is arranged with the push button to engage the power button; and the know is rotatably coupled to the bezel to rotate about the push button.

2. The oral irrigator assembly of claim 1, wherein selective movement of the knob adjusts both the pressure and the volume of the fluid expelled through the oral irrigator handle.

3. The oral irrigator assembly of claim 1, wherein:

the base includes a protrusion extending from a front face thereof; and a cradle is defined within a front portion of the protrusion to at least partially receive the oral irrigator handle therein.

4. The oral irrigator assembly of claim 3, wherein:

the cradle includes a first magnet device; and the oral irrigator handle includes a second magnet device corresponding with the first magnet device of the cradle to magnetically couple the oral irrigator handle to the cradle at a desired position.

5. The oral irrigator assembly of claim 4, wherein the first and second magnet devices allow the oral irrigator handle to be magnetically coupled to the cradle at any one of a plurality of desired positions relative to the cradle.

6. The oral irrigator assembly of claim 3, wherein:

the oral irrigator assembly further comprises a tube fluidly connecting the oral irrigator handle to the fluid reservoir and the pressure assembly; and the interface between the protrusion and the front face of the base forms a tube recess for at least partial receipt of the tube therein.

7. The oral irrigator assembly of claim 6, wherein the tube wraps about the protrusion when the oral irrigator handle is magnetically coupled to the base.

8. The oral irrigator assembly of claim 7, further comprising a tube routing aperture formed in a bottom portion of the base for at least partial receipt of the tube therein.

9. An oral irrigator assembly comprising:

a base including a pressure assembly;

a fluid reservoir supported by the base;

a handle fluidly coupled to the fluid reservoir;

a control assembly including a push button circumferentially surrounded by a knob, wherein a surface of the knob, engageable by a user, is substantially perpendicular to a face of the push button, engageable by the user, wherein the push button is arranged to turn the oral irrigator assembly on and off, and wherein the knob is mechanically coupled to the pressure assembly to mechanically adjust at least one of a pressure and a volume of a fluid expelled through the oral irrigator handle upon movement of the knob;

the control assembly further including a bezel coupled to the base, and wherein a leg of the push button projecting toward the base is received through a receiving port of the bezel; and the knob is rotatably coupled to the bezel to rotate about the push button.

10. The oral irrigator assembly of claim 9, wherein selective movement of the knob adjusts both the pressure and the volume of the fluid expelled through the handle.

11. The oral irrigator assembly of claim 9, wherein:

the base includes a protrusion extending from a front face thereof; and a cradle is defined within a front portion of the protrusion to at least partially receive the handle therein.

12. The oral irrigator assembly of claim 11, wherein:

the cradle includes a first magnet device; and the oral irrigator handle includes a second magnet device corresponding with the first magnet device of the cradle to magnetically couple the handle to the cradle at a desired position.

13. The oral irrigator assembly of claim 12, wherein the first and second magnet devices allow the handle to be magnetically coupled to the cradle at any one of a plurality of desired positions relative to the cradle.

14. The oral irrigator assembly of claim 11, wherein:

the oral irrigator assembly further comprises a tube fluidly connecting the handle to the fluid reservoir and the pressure assembly; and the interface between the protrusion and the front face of the base forms a tube recess for at least partial receipt of the tube therein.

15. The oral irrigator assembly of claim 14, wherein the tube wraps about the protrusion when the handle is coupled to the base.

16. The oral irrigator assembly of claim 15, further comprising a tube routing aperture formed in a bottom portion of the base for at least partial receipt of the tube therein.

17. The oral irrigator assembly of claim 1, wherein the pressure assembly comprises a control valve that varies a position of a fluid pathway between the fluid reservoir and the oral irrigator handle; and the control assembly further comprises a coupling link coupled to the knob and to the control valve, wherein movement of the knob rotates the coupling link to change a position of the control valve to change the pressure and volume of the fluid expelled through the oral irrigator handle.

18. The oral irrigator assembly of claim 17, wherein the coupling link comprises a center portion and a first finger coupled to a first end and a second finger coupled to a second end, wherein the first finger couples to the knob and the second finger couples to the control valve.

19. The oral irrigator of claim 1, wherein the knob is a rotating knob and a knurled knob is fixedly coupled to the rotating knob to rotate therewith.

20. The oral irrigator of claim 1, wherein the push button is coupled to the bezel and wherein the bezel comprises at least one limit that acts to limit the rotation of the knob.

21. The oral irrigator of claim 1, wherein the control assembly further comprises a coupling link coupled to the knob, wherein the coupling link rotates with the knob and extends through the base to couple to the pressure assembly.

22. The oral irrigator of claim 1, wherein the leg of the push button substantially penetrates the base.

* * * * *